US012578673B2

(12) United States Patent
Nakata et al.

(10) Patent No.: US 12,578,673 B2
(45) Date of Patent: Mar. 17, 2026

(54) HOUSING STRUCTURE AND RECORDING DEVICE

(71) Applicant: SEIKO EPSON CORPORATION, Tokyo (JP)

(72) Inventors: Satoshi Nakata, Matsumoto (JP); Kanji Momose, Matsumoto (JP); Hirokazu Anada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 14 days.

(21) Appl. No.: 18/664,725

(22) Filed: May 15, 2024

(65) Prior Publication Data

US 2024/0385566 A1 Nov. 21, 2024

(30) Foreign Application Priority Data

May 15, 2023 (JP) ................................ 2023-079901

(51) Int. Cl.
*G03G 21/00* (2006.01)
*G03G 15/00* (2006.01)
*G03G 21/16* (2006.01)

(52) U.S. Cl.
CPC ..... *G03G 21/1633* (2013.01); *G03G 15/6514* (2013.01); *B65H 2402/31* (2013.01); *B65H 2407/21* (2013.01); *G03G 2215/00392* (2013.01); *G03G 2221/1687* (2013.01); *G03G 2221/169* (2013.01)

(58) Field of Classification Search
CPC ........... G03G 15/6514; G03G 21/1633; G03G 21/1638; G03G 2221/1687; G03G 2221/169; G03G 2215/00392; B65H 2402/45; B65H 2402/31; B65H 2407/21; B65H 2801/06; H04N 1/00546; Y10T 70/5199; Y10T 70/5389
USPC .................................................. 399/124, 392
See application file for complete search history.

(56) References Cited

U.S. PATENT DOCUMENTS

| | | | | |
|---|---|---|---|---|
| 2004/0175210 A1* | 9/2004 | Otaka | B65H 5/062 | 271/274 |
| 2010/0098473 A1* | 4/2010 | Hosoi | G03G 21/1642 | 271/225 |
| 2010/0244373 A1* | 9/2010 | Sunohara | B65H 3/0669 | 271/264 |
| 2011/0001284 A1* | 1/2011 | Ohtsuki | G03G 21/1633 | 271/162 |

(Continued)

FOREIGN PATENT DOCUMENTS

| | | |
|---|---|---|
| JP | 2011053333 A * | 3/2011 |
| JP | 2018155977 A | 10/2018 |
| JP | 2019126949 A | 8/2019 |

*Primary Examiner* — Robert B Beatty
(74) *Attorney, Agent, or Firm* — CHIP LAW GROUP

(57) ABSTRACT

A housing structure includes a main housing, a first cover configured to open and close by rotating with respect to the main housing about a first axis along a horizontal direction, a second cover provided further inside than the first cover and configured to open and close with respect to the main housing together with the first cover by rotating around a second axis parallel to the first axis, a regulation section configured to regulate the second cover in a closed state in which the second cover is closed, and a restriction section configured to, when the first cover is closed, restrict the release of regulation by the regulation section.

13 Claims, 13 Drawing Sheets

(56) References Cited

U.S. PATENT DOCUMENTS

| | | | | |
|---|---|---|---|---|
| 2015/0084277 | A1* | 3/2015 | Maruyama | B65H 5/062 271/272 |
| 2019/0227478 | A1 | 7/2019 | Kikura et al. | |
| 2022/0267109 | A1* | 8/2022 | Nakajima | B65H 3/0653 |
| 2022/0382208 | A1* | 12/2022 | Tateishi | G03G 15/6514 |

* cited by examiner

HOUSING STRUCTURE AND RECORDING DEVICE

The present application is based on, and claims priority from JP Application Serial Number 2023-079901, filed May 15, 2023, the disclosure of which is hereby incorporated by reference herein in its entirety.

BACKGROUND

1. Technical Field

The present disclosure relates to a housing structure and a recording device.

2. Related Art

A recording device that records an image on a medium is known. The recording device is, for example, a laser printer or an inkjet printer.

When a front door opening button of the housing structure of the printer described in JP-A-2019-126949 is pressed, a lock by a lock claw is released and the front door opens. The front door supports a manual paper feed tray via a tray rotation shaft. When the front door is opened using the front door opening button in a state where the front door houses the manual paper feed tray, the front door and the manual paper feed tray open simultaneously. In this state where the front door is open, a photoreceptor unit inside the printer can be manually taken out by a person.

However, in the housing structure according to the related art, when the front door and the manual paper feed tray are simultaneously opened, there is a problem in that the momentum due to the weight of front door and the manual paper feed tray at the time of opening the front door and the manual paper feed tray increases compared to when the front door and the manual paper feed tray are opened one at a time.

SUMMARY

An aspect of solving the above problem is that a housing structure includes a main housing, a first cover configured to open and close by rotating with respect to the main housing about a first axis along a horizontal direction, a second cover provided further inside than the first cover and configured to open and close with respect to the main housing together with the first cover by rotating around a second axis parallel to the first axis, a regulation section configured to regulate the second cover in a closed state in which the second cover is closed, and a restriction section configured to, when the first cover is closed, restrict the release of regulation by the regulation section.

An aspect is a recording device including the housing structure and a recording section that is accommodated in the main housing and performs recording on a medium.

DESCRIPTION OF EMBODIMENTS

Hereinafter, embodiments will be described with reference to the drawings.

A First Embodiment Will be Described

An overview of recording device 1 according to the first embodiment will be described with reference to FIGS. 1 to 4.

Figure 1:
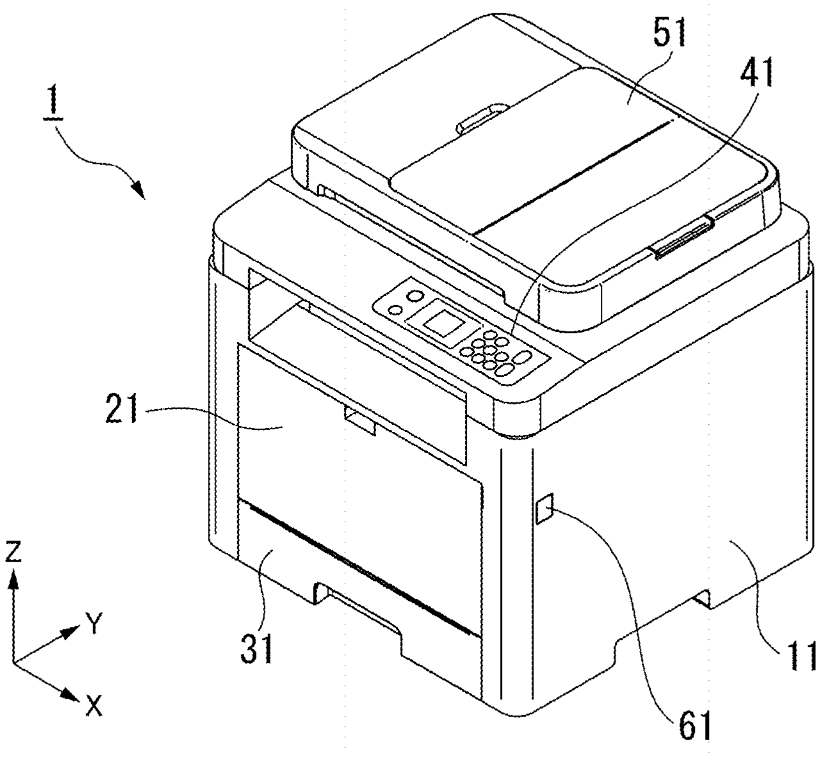
FIG. 1 is an external perspective view showing an example of a recording device according to the first embodiment.

FIG. 1 is an external perspective view showing an example of the recording device 1 according to the first embodiment.

In FIG. 1, for convenience of description, XYZ orthogonal coordinate axes, which are three-dimensional orthogonal coordinate axes, are shown.

In the present embodiment, the direction parallel to the X-axis corresponds to the left-right direction, which is the width direction of the recording device 1, the direction parallel to the Y-axis corresponds to the front-rear direction, which is the depth direction of the recording device 1, and the direction parallel to the Z-axis corresponds to the up-down direction, which is the height direction of the recording device 1. The positive side of the X-axis is in the right direction, the negative side of the X-axis is in the left direction, the positive side of the Z-axis is in the up direction, and the negative side of the Z-axis is in the down direction.

In the present embodiment, a face of the recording device 1 on the negative side of the Y-axis is referred to as a front face. The face of the recording device 1 on the positive side of the Y-axis may be referred to as a back face. The positive side of the Y-axis is also referred to as a back side.

In the present embodiment, the recording device 1 is a laser printer with a scanner that reads a document placed on a placement table. Such a recording device 1 may be referred to as a multifunction device. The recording device 1 may include a document feeder.

In addition to the above-described scanner or instead of the above-described scanner, the recording device 1 may include an automatic document transport type scanner that reads a document while transporting the document. Here, the scanner and the document feeder may be integrated. The recording device 1 may be a printer that does not have a scanner.

Here, the printer is not necessarily limited to a laser printer, and an inkjet type printer may be used.

In the present embodiment, the medium to be printed is paper, which may be referred to as a sheet, or the like. The medium to be printed on is not necessarily paper. For example, an auxiliary tray may be used, and a compact disc recordable (CD-R) may be used as the medium.

In the present embodiment, a housing structure of a printer will be described as an example, but a similar housing structure may be applied to other apparatuses. Another apparatus may be, for example, any apparatus having a structure for transporting a medium, and may be, as a specific example, an image reading apparatus, a finisher, or the like.

In the present embodiment, a detailed description of the scanner is omitted.

Figure 2:
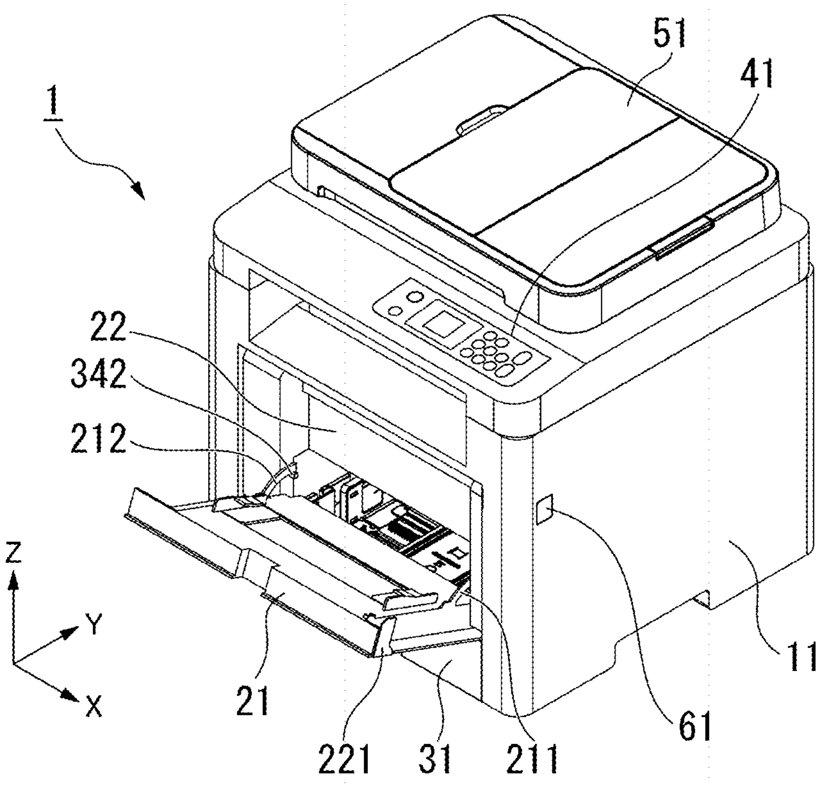
FIG. 2 is an external perspective view showing an example of a state in which an outer cover of recording device according to the first embodiment is opened.

FIG. 2 is an external perspective view showing an example of a state in which the outer cover 21 of the recording device 1 according to the first embodiment is open.

Figure 3:
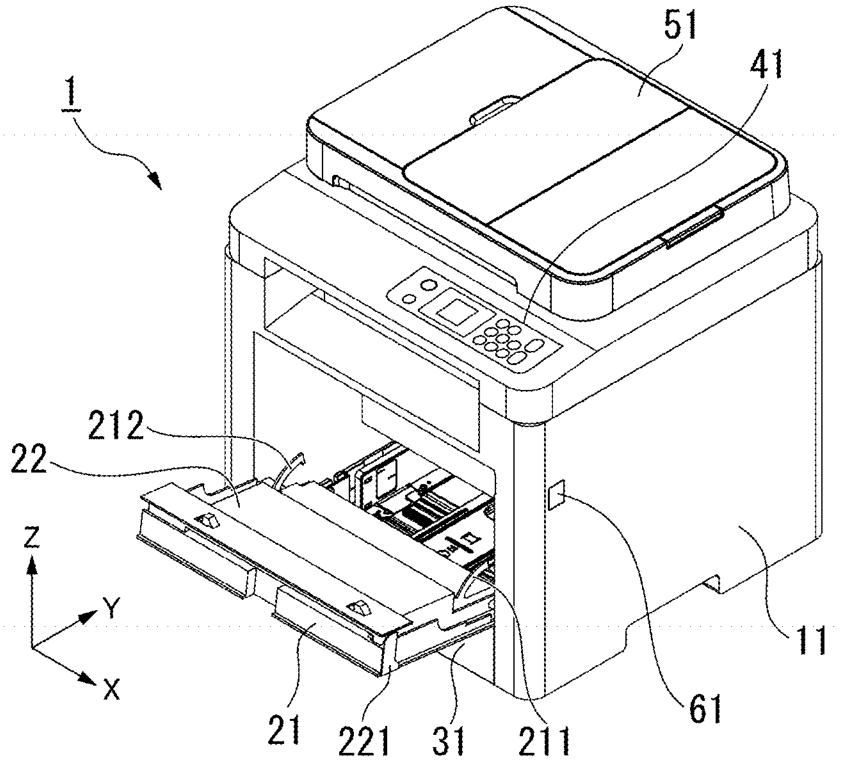
FIG. 3 is an external perspective view showing an example of a state in which the outer cover and the inner cover of recording device according to the first embodiment are open.

FIG. 3 is an external perspective view showing an example of a state in which the outer cover 21 and the inner cover 22 of the recording device 1 according to the first embodiment are open.

In FIGS. 2 and 3, XYZ orthogonal coordinate axes similar to those in FIG. 1 are shown.

The recording device 1 includes a main housing 11, the outer cover 21, the inner cover 22, a sheet cassette 31, a feeder section 51, and an unlock button 61.

A first arm section 211, a second arm section 212, and a button regulation section 221 shown in FIGS. 2 and 3, and a second protrusion 342 shown in FIG. 2, will be described later.

The outer cover 21 is openable and closeable with respect to the main housing 11. The outer cover 21 may be made of, for example, a resin.

As shown in FIG. 1, the outer cover 21 constitutes the front face of the main housing 11 in a closed state, that is, when not in use, the outer cover 21 is accommodated in the main housing 11 and serves as a cover of the main housing 11.

As shown in FIG. 2, when the outer cover 21 is open, it forms a manual feed path. The manual feed path is a section where a user manually places a sheet toward the inside of the main housing 11.

In this way, the outer cover 21 serves as both a cover of the main housing 11 and a manual feed path.

The outer cover 21 may be said to be a manual feed unit or the like.

The inner cover 22 is openable and closeable with respect to the main housing 11. The inner cover 22 may be made of, for example, resin.

When the inner cover 22 is closed as shown in FIG. 2, it closes a front face side of a take-out opening of a writing unit 111, which will be described later, and when the inner cover 22 is open as shown in FIG. 3, it opens the front face side of the take-out opening of the writing unit 111.

As described above, the inner cover 22 is located at the inner side of the main housing 11 with respect to the outer cover 21 and separates the printing section installed inside the main housing 11 from the outside.

The sheet cassette 31 is located below the outer cover 21 and the inner cover 22. The sheet cassette 31 can accommodate a plurality of sheets.

A panel section 41 is located on the upper surface of the main housing 11. The panel section 41 includes a display panel and executes to display information regarding printing or the like on a screen of the display panel. The panel section 41 may have a touch panel function. In this case, the panel section 41 receives a user's operation by the touch panel function.

The feeder section 51 is provided above the upper face of the main housing 11. The feeder section 51 has a function of feeding a sheet.

In the present embodiment, the unlock button 61 is a button for releasing the lock of the inner cover 22.

In the present embodiment, the unlock button 61 is provided on the right side surface of the main housing 11, but may be provided at another position, for example, may be provided on the left side surface of the main housing 11.

Figure 4:
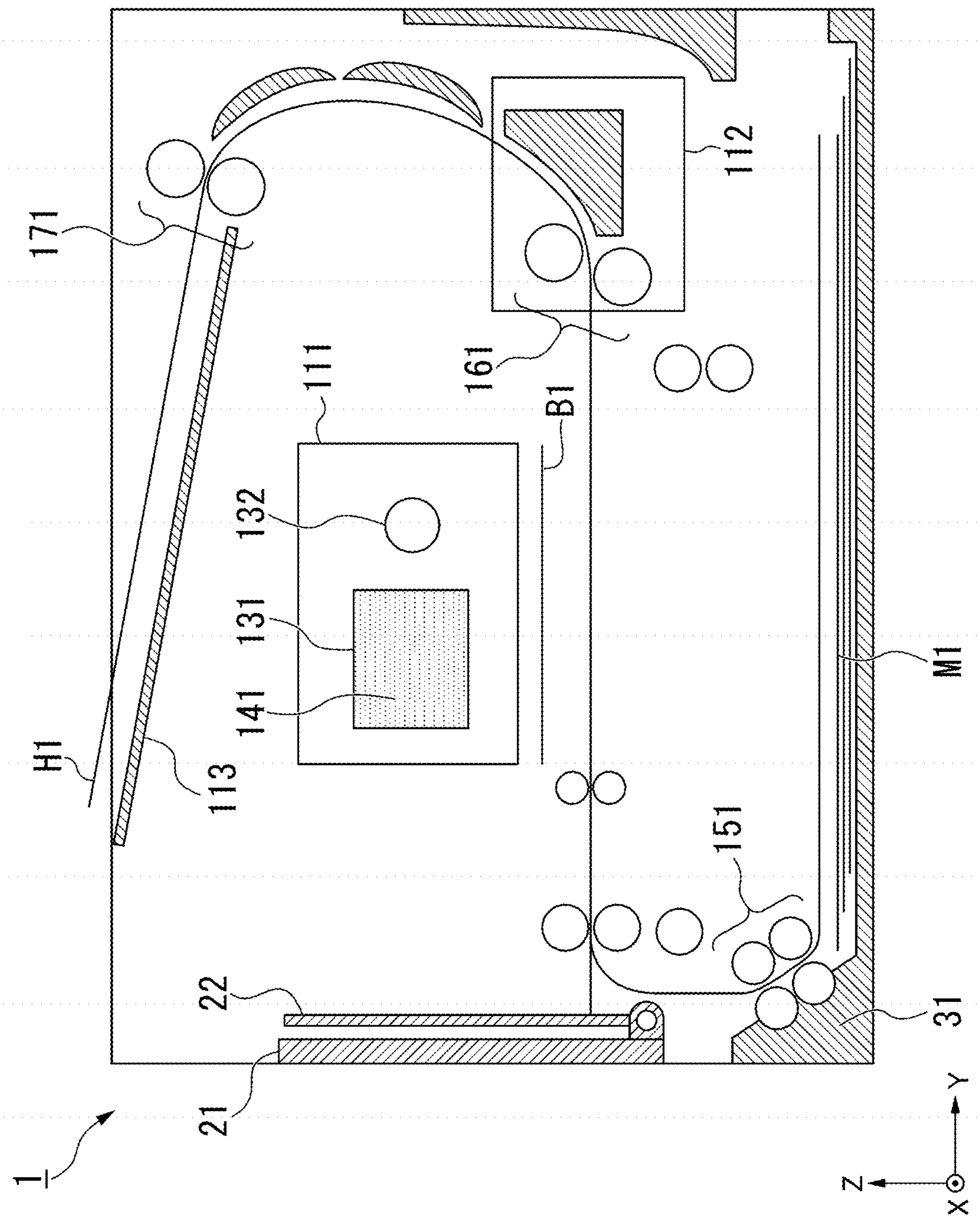
FIG. 4 is a view showing an example of a schematic configuration of the inside of recording device according to the first embodiment.

FIG. 4 is a view showing an example of a schematic configuration of the inside of the recording device 1 according to the first embodiment. FIG. 4 shows XYZ orthogonal coordinate axes similar to those in FIG. 1.

In the example of FIG. 4, components other than the writing unit 111, which is an example of the printing section, are illustrated in a cross-sectional view.

In the example of FIG. 4, as components of the recording device 1, the outer cover 21, the inner cover 22, the sheet cassette 31, the writing unit 111, an detachable and attachable section B1, a fixing unit 112, a paper discharge tray 113, and various roller sections are shown.

In the example of FIG. 4, sheets M1 accommodated in the sheet cassette 31 and a transporting path H1 of the sheets M1 are shown. In the example of FIG. 4, as the transporting path H1, the manual feed path is also shown together with the path from the sheet cassette 31.

Here, as roller sections, for example, a pickup roller section 151, a fusing roller section 161, a paper discharge roller section 171, and the like are shown.

In a state where the outer cover 21 is open, a path through which a user can directly manually insert a sheet is formed.

In a state in which the inner cover 22 is open, the user can remove the writing unit 111 installed inside the inner cover 22 or install the writing unit 111 inside the inner cover 22.

The user can remove a sheet or the like jammed in the main housing 11 in a state where the inner cover 22 is open.

The writing unit 111 is attachable to and detachable from the detachable and attachable section B1 in the main body of the recording device 1.

The writing unit 111 is an integrated unit for writing and recording an image to be printed on a sheet M1. The writing unit 111 is, for example, a unit in which functions of electronic charging, exposing, developing, and transferring a photoreceptor 132 are integrated. The writing unit 111 includes a developer container 131 and the photoreceptor 132.

The developer container 131 is a container that stores a developer 141. The developer 141 is, for example, toner powder. The toner may be mixed with a carrier.

The writing unit 111 enables, for example, a user to replace the developer container 131 or the like, or to replenish the developer container 131 with the developer 141.

The detachable and attachable section B1 is provided on the main housing 11 side and has a structure in which the writing unit 111 can be attached and detached.

An outline of a printing operation in the recording device 1 will be described.

A sheet M1 stored in the sheet cassette 31 is picked up by the pickup roller section 151 and transported to a writing position of the writing unit 111. Then, the writing unit 111 performs printing on the sheet M1 with toner, and thereafter, the fixing unit 112 fixes the toner in place. The printed sheet M1 passes through the paper discharge roller section 171 and is discharged to the paper discharge tray 113.

In a state where the outer cover 21 is open, a sheet is supplied from the outer cover 21 to the inside of the recording device 1.

An example of a mechanism for locking the inner cover 22 by the outer cover 21 will be described with reference to FIGS. 5 to 7.

Figure 5:
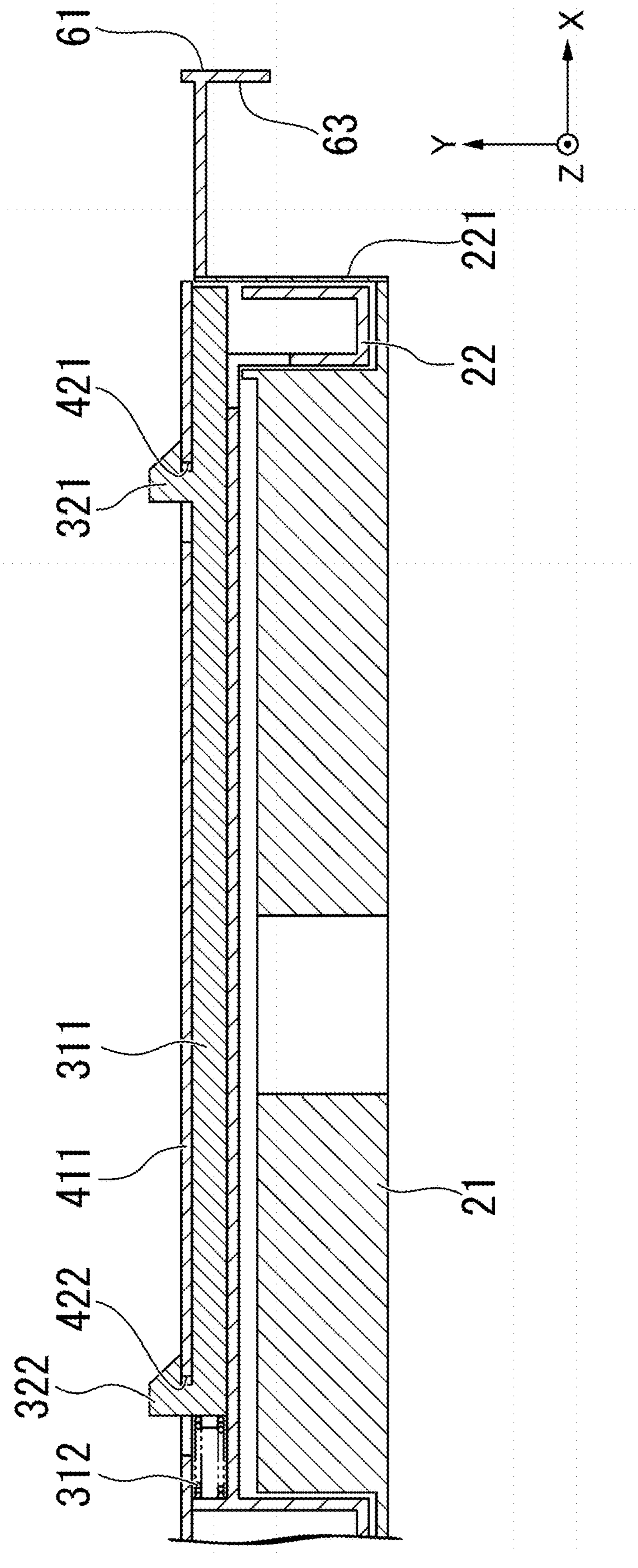
FIG. 5 is a cross-sectional view showing an example of a state where the outer cover and the inner cover of recording device according to the first embodiment are closed.
Figure 6:
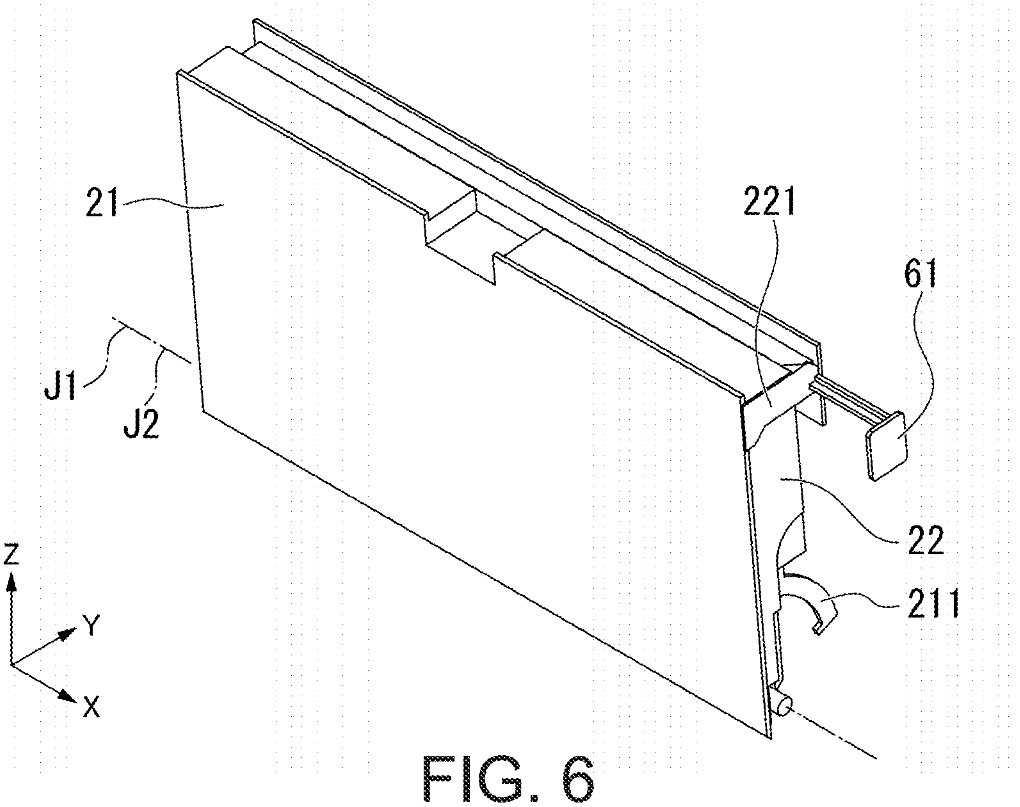
FIG. 6 is an external perspective view showing an example of a state in which the outer cover and the inner cover of the recording device according to the first embodiment are closed.
Figure 7:
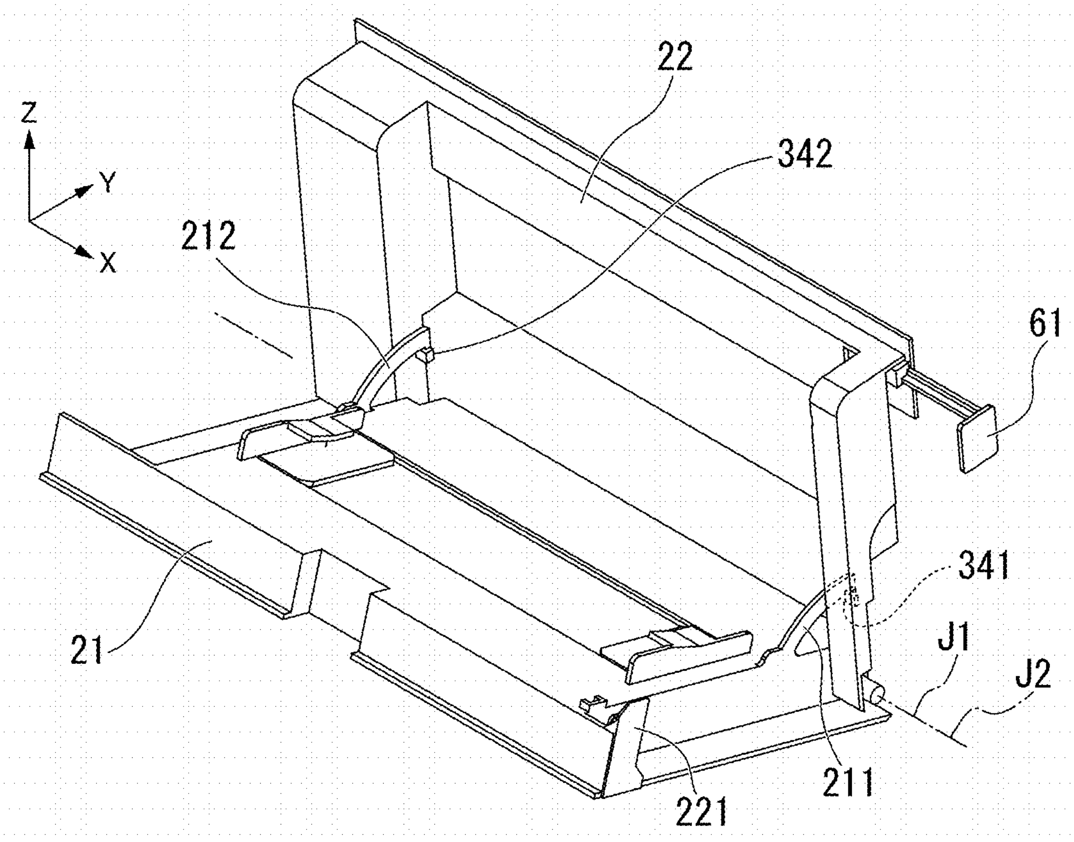
FIG. 7 is an external perspective view showing an example of a state in which the outer cover of recording device according to the first embodiment is opened and the inner cover is closed.

In the examples of FIGS. 5 to 7, for convenience of description, components other than the outer cover 21, the inner cover 22, and the unlock button 61 are not shown.

FIG. 5 is a cross-sectional view showing an example of a state where the outer cover 21 and the inner cover 22 of the recording device 1 according to the first embodiment are closed.

FIG. 5 shows XYZ orthogonal coordinate axes similar to those in FIG. 1.

In the example of FIG. 5, as viewed from the upper side to the lower side, a cross-section of the outer cover 21 and the inner cover 22 at a predetermined height is shown. In the example of FIG. 5, the lower side of the paper is the front face side of the recording device 1, and the upper side of the paper is the inner side of the recording device 1.

FIG. 5 shows an example of a cross-section of the cover lock mechanism.

The front face of the outer cover 21 has a planar shape, and becomes a face parallel to the XZ plane in a state where the outer cover 21 is closed and integrated with the main housing 11.

The outer cover 21 includes the plate-shaped button regulation section 221, which extends from the front face of the outer cover 21 toward the back side in a direction perpendicular to the front face, at the right end portion where the unlock button 61 is present from amongst the end portions in the left-right direction, which is the horizontal direction.

The front face of the inner cover 22 has a planar shape, and becomes a surface parallel to the XZ plane in a state where the inner cover 22 is closed and integrated with the main housing 11.

The inner cover 22 includes a lock lever 311 and a spring 312.

The lock lever 311 has a rod shape extending in the left-right direction, which is the horizontal direction. This direction is the longitudinal direction of the lock lever 311.

The lock lever 311 includes a first hook 321 and a second hook 322 that protrude toward the back side.

The first hook 321 is provided further to the right side than the second hook 322. More specifically, the first hook 321 is located further to the right side in the left-right direction than is the center position of the lock lever 311, and the second hook 322 is located further to the left side than is the center position.

The main housing 11 of the recording device 1 includes a main external structure 411 that faces the inner cover 22 in a state in which the inner cover 22 is closed inside the main housing 11.

The main external structure 411 includes, on its front face side, a first hole 421 that engages with the first hook 321 and a second hole 422 that engages with the second hook 322.

In the example of FIG. 5, the first hook 321 is engaged with the first hole 421 and the second hook 322 is engaged with the second hole 422.

The spring 312 is located at the left end portion of the lock lever 311 where the unlock button 61 is not present. The spring 312 is in contact with the lock lever 311 and biases the lock lever 311 in the direction from left to right.

As described above, in the example of FIG. 5, the first hook 321 and second hook 322, which are two hook portions of the lock lever 311, pass through the first hole 421 and the second hole 422, which are the two holes of the main external structure 411. The first hook 321 and second hook 322 are hooked on the back face of the main external structure 411 by the lock lever 311 being biased rightward by the spring 312. Thus, the inner cover 22 is in a closed state.

Here, a state in which the outer cover 21 and the inner cover 22 are closed will be described. In this state, the unlock button 61 is regulated by the button regulation section 221, that is, the button regulation section 221 is positioned further to the left side than is the left end portion of the unlock button 61, so that the unlock button 61 cannot be pressed to the left side.

In this case, the first hook 321 is engaged with the first hole 421 and the second hook 322 is engaged with the second hole 422. As a result, the inner cover 22 is fixed to the main external structure 411 and maintains the closed state.

As described above, in the present embodiment, the unlock button 61 and the lock lever 311 are separate components, and are separated from each other by the button regulation section 221, which extends from the outer cover 21. Thus, the unlock button 61 cannot be pressed unless the outer cover 21 is opened and the button regulation section 221 extending from the outer cover 21 is moved.

On the other hand, a state in which the outer cover 21 is open and the inner cover 22 is closed will be described. In this state, the unlock button 61 is not regulated by the button regulation section 221.

In this case, the lock lever 311 slides in conjunction with the unlock button 61. Specifically, when the unlock button 61 is manually pressed to the left by the user, the left end of the unlock button 61 comes into contact with the right end of the lock lever 311 and moves the lock lever 311 to the left. At this time, the left end of the lock lever 311 comes into contact with the right end of the spring 312 and compresses the spring 312 to the left. In this state, the first hook 321 can be disengaged from the first hole 421, and the second hook 322 can be disengaged from the second hole 422. By this, the inner cover 22 can be opened.

When the unlock button 61 is not pressed to the left, the first hook 321 is engaged with the first hole 421 and the second hook 322 is engaged with the second hole 422. As a result, the inner cover 22 is fixed to the main external structure 411 and maintains the closed state.

When the user manually closes the inner cover 22 again after it was opened, the first hook 321 engages with the first hole 421 and the second hook 322 engages with the second hole 422.

FIG. 6 is an external perspective view showing an example of a state where the outer cover 21 and the inner cover 22 of the recording device 1 according to the first embodiment are closed.

FIG. 7 is an external perspective view showing an example of a state in which the outer cover 21 of the recording device 1 according to the first embodiment is open and the inner cover 22 is closed.

In FIGS. 6 and 7, XYZ orthogonal coordinate axes similar to those in FIG. 1 are shown.

In FIGS. 6 and 7, a first axis J1, which is the center of rotation when the outer cover 21 is opened and closed, and the second axis J2, which is the center of rotation when the inner cover 22 is opened and closed, are shown.

The first axis J1 and the second axis J2 are parallel to each other and extend horizontally. In the present embodiment, the first axis J1 and second axis J2 coincide with each other and are the same axes. In other words, in the present embodiment, the first axis J1, which is a rotation shaft when the outer cover 21 is opened and is closed, and the second axis J2, which is a rotation shaft when the inner cover 22 opened and is closed, are coaxial.

In the state shown in FIG. 6, the unlock button 61 is regulated by the button regulation section 221 and cannot be pressed.

On the other hand, in the state shown in FIG. 7, the unlock button 61 is not regulated by the button regulation section 221 and can be pressed.

In the present embodiment, in a closed state, the outer cover 21 is configured to be fixed by a plastic member having a spring property (not shown) or by a protrusion via a spring. The fixing force is set to such a degree that the outer cover 21 can be opened by the user's manual force.

In the present embodiment, when the unlock button 61 is pressed by the user in the state shown in FIG. 7, the inner cover 22 opens by its own weight or the like.

Here, the outer cover 21 includes, on the right side, an first arm section 211 that extends downward in an arc shape from a predetermined height in the height direction of the outer cover 21. The outer cover 21 includes, on the left side, a second arm section 212 that extends downward in an arc shape from the predetermined height. The shape may be called an arch shape instead of the arc shape.

The distal end section of the first arm section 211 and the distal end section of the second arm section 212 each have a hook shape.

The inner cover 22 has a first protrusion 341 on the inner surface on the right side. The inner cover 22 has the second protrusion 342 on the inner surface on the left side.

In a state where the outer cover 21 is open and the inner cover 22 is closed, the hook-shaped distal end of the first arm section 211 of the outer cover 21 catches on and is supported by the first protrusion 341 of the inner cover 22 and the hook-shaped distal end of the second arm section 212 of the outer cover 21 catches on and is supported by the second protrusion 342 of the inner cover 22. Thus, in this state, the outer cover 21 is supported by the inner cover 22 at a predetermined opening angle, and the relative positional relationship between the outer cover 21 and inner cover 22 is fixed.

The predetermined opening angle is, for example, 70°, but may be another angle. The outer cover 21 is held from the closed state in an open state at the opening angle.

As described above, in the recording device 1 according to the present embodiment, as a configuration in which the outer cover 21 and inner cover 22 do not open at the same time, a configuration in which the inner cover 22 opens after the outer cover 21 opens is adopted.

Therefore, in the recording device 1 according to the present embodiment, compared to a case where the outer cover 21 and inner cover 22 are opened at the same time, it is possible to reduce the momentum due to their own weights when the outer cover 21 and the inner cover 22 are opened. Accordingly, in the recording device 1 according to the present embodiment, for example, it is possible to reduce the impact when the outer cover 21 and the inner cover 22 are opened, and to reduce the impact sound generated when the outer cover 21 and the inner cover 22 are opened.

In related art, for example, there is a configuration in which the outer cover and the inner cover are simultaneously opened by an operation in which a user presses one button provided on the side surface of the recording device, and the outer cover and inner cover simultaneously rotate to the open position by their own weights. With such a configuration, for example, in a case where the impact is large, there is a concern that damage may be caused, and in a case where the impact sound is large, there is a concern that noise may be generated. However, such a problem can be solved in the present embodiment. In the prior art, the impact includes, for example, an impact caused by a collision between the outer cover and the inner cover.

In the recording device 1 according to the present embodiment, the inner cover 22 is opened by a procedure in which the user opens the outer cover 21 and then presses the unlock button 61 to open the inner cover 22.

Therefore, in the recording device 1 according to the present embodiment, it is possible to reduce the momentum due to the weight of the inner cover 22 when the inner cover 22 is opened.

In the recording device 1 according to the present embodiment, for example, when the user opens the outer cover 21 and inner cover 22 and inserts and removes the writing unit 111, it is possible to reduce the opening and closing sounds of the outer cover 21 and inner cover 22.

As described above, in the present embodiment, the outer cover 21 and the inner cover 22 provided on the inner side of the outer cover 21 are opened at different times. Therefore, for example, it is possible to suppress the generated impact and sound compared with the impact and sound generated when the outer cover 21 and the inner cover 22 are opened simultaneously.

The recording device 1 according to the present embodiment has a configuration in which the inner cover 22 cannot be opened unless the outer cover 21 is opened. Therefore, in the present embodiment, the outer cover 21 is opened earlier than the inner cover 22 due to the time difference.

In the recording device 1 according to the present embodiment, the opening and closing operations of the outer cover 21 and the inner cover 22 are performed at different times. Therefore, for example, unintended opening and closing of the outer cover 21 and the inner cover 22 can be prevented.

Here, for example, the inner cover 22 may be opened by its own weight, or may be opened by a biasing force of a spring or the like (not shown).

For example, the outer cover 21 may be opened by the user's manual operation, may be opened by its own weight, or may be opened by a biasing force of a spring or the like (not shown).

In the present embodiment, the first axis J1, about which the outer cover 21 pivots during opening and closing, and the second axis J2, about which the inner cover 22 pivots during opening and closing, are coaxial. However, as another example, these shafts may be different from each other.

In the present embodiment, a case where the outer cover 21 is openably and closeably attached to the main housing 11 is described, but as another example, the outer cover 21 may be attached to another portion in the recording device 1, and for example, may be rotatably attached to the inner cover 22.

In the present embodiment, a configuration in which the unlock button 61 is prevented by the button regulation section 221 from being pressed has been described, but another configuration may be used to prevent the unlock button 61 from being pressed. For example, a configuration may be used in which a component having an arbitrary shape comes into contact with a button face 63, which is the surface of the portion extending in the Y-axis direction of the unlock button 61 and is the surface on the side where the unlock button 61 is pressed and moved.

Although the reference numeral of the button face 63 is shown in FIG. 5 for description, the reference numeral of the button face 63 is not shown in the other drawings.

The housing structure of the recording device 1 according to the present embodiment includes the main housing 11, the outer cover 21, which can be opened and closed by rotating around the first axis J1 along the horizontal direction with respect to the main housing 11, the inner cover 22, which is provided inside the outer cover 21 and can be opened and closed by rotating around the second axis J2 parallel to the first axis J1 with respect to the main housing 11, a regulation section including the lock lever 311 that regulates the inner cover 22 in a closed state, and a restriction section that restricts the release of the regulation of the regulation section when the outer cover 21 is closed.

Here, in the present embodiment, the outer cover 21 constitutes an example of a first cover, and the inner cover 22 constitutes an example of a second cover.

In the present embodiment, the lock lever 311 having the first hook 321 and second hook 322, the spring 312, the first hole 421, and second hole 422 constitute an example of a regulation section.

In the present embodiment, an example of a restriction section is configured by the button regulation section 221, but another configuration may be used as the restriction section.

Therefore, in the housing structure of the recording device 1 according to the present embodiment, when the outer cover 21 is closed, the inner cover 22 cannot be opened because the release of the regulation section is restricted by the restriction section. In the housing structure, the regulation section can be released by opening the outer cover 21, and the inner cover 22 can be opened.

By this, in the housing structure, simultaneous opening of the outer cover 21 and the inner cover 22 is suppressed, and the momentum when these covers are opened can be suppressed.

Furthermore, in the housing structure, the momentum when the outer cover 21 and the inner cover 22 are opened may be further suppressed by the outer cover 21 and inner cover 22 rotating separately, for example, by friction between the outer cover 21 and inner cover 22.

For example, the outer cover 21 may be configured to indirectly rotate with respect to the main housing 11. As an example, the outer cover 21 may be attached to the inner cover 22 instead of to the main housing 11.

For example, the entire inner cover 22 may not be disposed inside the outer cover 21, and at least a part of the inner cover 22 may be covered by the outer cover 21.

The restriction by the button regulation section 221 may be released at an arbitrary timing after the outer cover 21 starts to open. For example, the lock lever 311 may be releasable when the outer cover 21 starts to open even slightly, the lock lever 311 may be releasable when the outer cover 21 rotates by a predetermined amount or more, or a configuration may be used in which the lock lever 311 cannot be released until the outer cover 21 is completely opened.

The housing structure of the recording device 1 according to the present embodiment further includes an operation section which can be displaced from a regulation position where the regulation section regulates the inner cover 22 in the closed state to a release position where the regulation of the inner cover 22 is released. The restriction section is located on the outer cover 21 and restricts displacement of the regulation section by the operation section when the outer cover 21 is closed.

Here, in the present embodiment, the unlock button 61 constitutes an example of an operation section, and the button regulation section 221 constitutes an example of a restriction section.

Therefore, in the housing structure of the recording device 1 according to the present embodiment, the operation section cannot displace the regulation section because of the restriction section so that it is possible to shift the timing between when the outer cover 21 and the inner cover 22 open.

In the housing structure of the recording device 1 according to the present embodiment, the regulation section is provided in the inner cover 22, and includes a sliding member which can slide with respect to the inner cover 22. The sliding member has an engagement section engageable with the main housing 11. The operation section can slide the sliding member by contacting and displacing the sliding member. The restriction section is interposed between the operation section and the sliding member when the outer cover 21 is closed.

Here, in the present embodiment, the lock lever 311 constitutes an example of a sliding member, and the first hook 321 constitutes an example of an engagement section.

Therefore, in the housing structure of the recording device 1 according to the present embodiment, in a state where the outer cover 21 is closed, since the restriction section is interposed between the operation section and the sliding member, the operation section cannot displace the regulation section. On the other hand, when the outer cover 21 is opened, the restriction section is retracted from between the operation section and the sliding member, so that the sliding member can be slid to release regulation and the inner cover 22 can be opened.

In the present embodiment, as the configuration of the restriction section, a configuration is used in which the restriction section enters between the operation section and the sliding member to restrict contact therebetween. However, another configuration may be used, for example, a configuration in which the restriction section does not enter between the operation section and the sliding member to restrict displacement of the operation section may be used.

In the housing structure of the recording device 1 according to the present embodiment, the sliding member has the second engagement section which can be engaged with the main housing 11. The engagement section and the second engagement section are positioned in a longitudinal direction of the sliding member.

Here, the second hook 322 constitutes an example of a second engagement section.

Therefore, in the housing structure of the recording device 1 according to the present embodiment, by providing the engagement section on both sides in the longitudinal direction of the sliding member, it is possible to more reliably regulate the inner cover 22 in the closed state. In particular, since the first hook 321 is located further to the right side than is the center position of the lock lever 311 in the left-right direction, and the second hook 322 is located further to the left side than is the center position, it is possible to suppress one side from lifting up without closing with respect to the center position.

In the housing structure of the recording device 1 according to the present embodiment, the sliding member is slidable in parallel with the first axis J1 and the second axis J2.

Therefore, in the housing structure of the recording device 1 according to the present embodiment, by providing the sliding member in parallel to the first axis J1 and the second axis J2, a simple configuration can be achieved.

In the housing structure of the recording device 1 according to the present embodiment, the first axis J1 and the second axis J2 are coaxial.

Therefore, in the housing structure of the recording device 1 according to the present embodiment, the first axis J1 and the second axis J2 are coaxial with each other, and thus it is possible to reduce the size.

The housing structure of the recording device 1 according to the present embodiment includes a recording section which is accommodated in the main housing 11 and performs recording on a medium.

Here, in the present embodiment, a recording section is configured by the writing unit 111 and the medium is configured by the sheets M1.

The housing structure of the recording device 1 according to the present embodiment further includes a detachable and attachable section B1 to and from which the developer unit containing the developer 141 can be attached and detached.

The inner cover 22 is a cover that covers the detachable and attachable section B1.

The outer cover 21 is a placement section on which a medium to be recorded on by the recording section is placed.

Here, in the present embodiment, the developer unit is configured by the developer container 131, but as another example, the developer unit may be configured by the writing unit 111 including the developer container 131. In the present embodiment, the developer container 131 is integrated with the writing unit 111. However, as another example, the developer container 131 may be configured as an independent body.

Here, in the related art, for example, in a case where it is used in a state where the outer cover, which is the sheet feeding tray is opened, there is no problem because only the inner cover is opened up when the developer container, which is the toner container, is to be attached and detached. However, in a case where it is used in a state where the feeding tray is not opened up, there is a risk that the outer cover and the inner cover will open simultaneously.

On the other hand, even in such a case, it is possible to suppress the outer cover 21 and the inner cover 22 from opening simultaneously in the housing structure of the recording device 1 according to the present embodiment.

A Second Embodiment Will be Described

An a-th recording device 1*a* according to the second embodiment will be described with reference to FIGS. 8 to 14.

In the present embodiment, detailed description of the same components as those of the recording device 1 according to the first embodiment will be omitted, and components different from those of the first embodiment will be described in detail.

Here, the configuration of the a-th recording device 1*a* according to the second embodiment is schematically different from the configuration of the recording device 1 according to the first embodiment in that an a-th restriction section 511*a* is provided instead of the button regulation section 221 according to the first embodiment.

Therefore, each of FIGS. 8 to 13 shows only configuration components in the vicinity of the a-th restriction section 511*a* according to the present embodiment that are different from the first embodiment.

Figure 8:
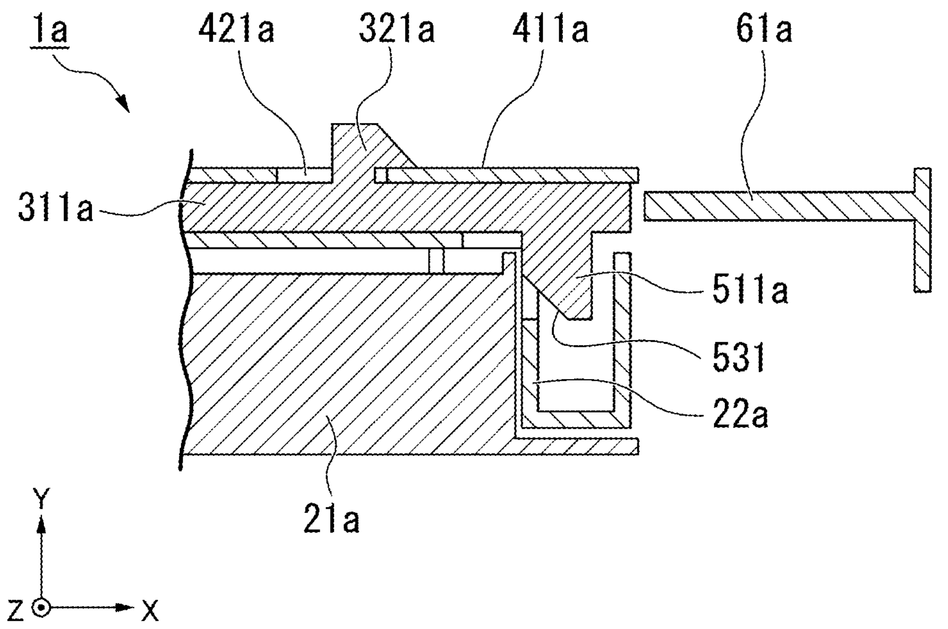
FIG. 8 is a cross-sectional view showing an example of a state in which the a-th unlock button of the a-th recording device according to the second embodiment is not pressed.

FIG. 8 is a cross-sectional view showing an example of a state in which an a-th unlock button 61*a* of the a-th recording device 1*a* according to the second embodiment is not pressed.

Figure 9:
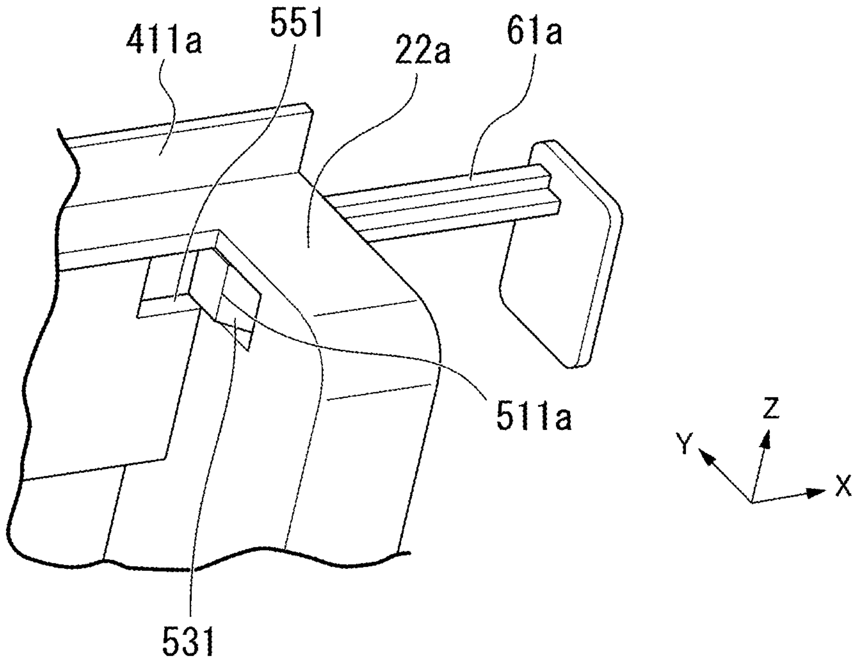
FIG. 9 is an external appearance view showing an example of a state in which the a-th unlock button of the a-th recording device according to the second embodiment is not pressed.

FIG. 9 is an external appearance view showing an example of a state in which the a-th unlock button 61*a* of the a-th recording device 1*a* according to the second embodiment is not pressed.

In FIGS. 8 and 9, XYZ orthogonal coordinate axes similar to those in FIG. 1 are shown.

In the example of shown in FIG. 8, as viewed from the upper side to the lower side, a cross-section of the a-th outer cover 21*a* and the a-th inner cover 22*a* at a predetermined height is shown. In the example of FIG. 8, the lower side of the paper is the front face side of the a-th recording device 1*a*, and the upper side of the paper is the inner side of the a-th recording device 1*a*.

In the state shown in FIGS. 8 and 9, an a-th outer cover 21*a* and an a-th inner cover 22*a* are closed.

FIG. 8 shows the a-th outer cover 21*a*, the a-th inner cover 22*a*, an a-th lock lever 311*a* of the a-th inner cover 22*a*, a 1*a*-th hook 321*a* of the a-th lock lever 311*a*, the a-th restriction section 511*a* of the a-th lock lever 311*a*, a guide section 531 of the a-th restriction section 511*a*, an a-th main external structure 411*a*, a 1*a*-th hole 421*a* of the a-th main external structure 411*a*, and the a-th unlock button 61*a*.

Here, the configuration of the a-th outer cover 21*a* is different from the configuration of the outer cover 21 according to the first embodiment in that the a-th outer cover 21*a* does not include the button regulation section 221, and is the same in other respects.

The configurations of the a-th inner cover 22*a* and the a-th lock lever 311*a* are different from the configurations of the inner cover 22 and the lock lever 311 according to the first embodiment in that the a-th inner cover 22*a* and the a-th lock lever 311*a* include the a-th restriction section 511*a*, and are the same in other respects.

The configuration of the 1*a*-th hook 321*a* is the same as the configuration of the first hook 321 according to the first embodiment.

The configuration of the a-th main external structure 411*a* is the same as the configuration of the main external structure 411 according to the first embodiment.

The configuration of the 1*a*-th hole 421*a* is the same as the configuration of the first hole 421 according to the first embodiment.

The configuration of the a-th unlock button 61*a* is the same as the configuration of the unlock button 61 according to the first embodiment.

Components of the a-th recording device 1*a* not shown in FIG. 8 are the same as the components of the recording device 1 according to the first embodiment.

The a-th restriction section 511*a* according to the present embodiment will be described.

The a-th restriction section 511*a* is located in the vicinity of the right end of the a-th lock lever 311*a* and is a protrusion that protrudes from the surface of the a-th lock lever 311*a*, which faces the a-th outer cover 21*a* in a state where the a-th outer cover 21*a* and the a-th inner cover 22*a* are closed. In the example shown in FIG. 8, the protrusion protrudes from the positive side to the negative side of the Y-axis.

In a state where the a-th lock lever 311*a* is not pressed by the a-th unlock button 61*a*, the a-th restriction section 511*a* is located further to the right than is the right end of the a-th outer cover 21*a* in the left and right directions, which are horizontal directions. That is, in the state, when the a-th outer cover 21*a* and the a-th inner cover 22*a* are closed, then the a-th restriction section 511*a* and the a-th outer cover 21*a* do not overlap as viewed in the depth direction, which is parallel to the Y-axis.

The a-th restriction section 511*a* has the guide section 531 on the side facing the a-th outer cover 21*a* in a state where the a-th outer cover 21*a* and the a-th inner cover 22*a* are closed.

In the example of FIGS. 8 and 9, the a-th restriction section 511*a* schematically has a shape, when viewed from the upper side to the lower side, of a rectangular parallelepiped shape formed by planes parallel to the XY, YZ, and XZ planes in which a left corner of a protruding tip is cut off by a plane parallel to the vertical direction. In the present example, the surface is a surface that is parallel to a line connecting a position on the left side edge and a position on the front side edge and that is parallel to the up-down direction when viewed from above. The a-th restriction section 511*a* has a pentagonal shape when viewed from above.

In this example, the guide section 531 is formed of a surface having a cut surface shape. The surface of the guide section 531 is an inclined surface when viewed downward from above.

The a-th restriction section 511*a* does not necessarily have to be formed by cutting off a part of a rectangular parallelepiped, and may be formed in a final shape from the beginning.

The shape of the guide section 531 may be, for example, an arbitrary trapezoidal shape or another shape such as a curved shape when viewed from the upper side to the lower side.

FIG. 9 shows the a-th inner cover 22*a*, a groove 551 of the a-th inner cover 22*a*, the a-th restriction section 511*a* of the a-th lock lever 311*a*, the guide section 531 of the a-th restriction section 511*a*, the a-th main external structure 411*a*, and the a-th unlock button 61*a* in the same state as FIG. 8.

Here, the a-th inner cover 22*a* is provided with the groove 551 at the right end on the front face, which enables the a-th restriction section 511*a* to move horizontally.

The groove 551 has at least a width in the width direction that enables the a-th restriction section 511*a* to move when the a-th lock lever 311*a* moves in the horizontal direction.

Figure 10:
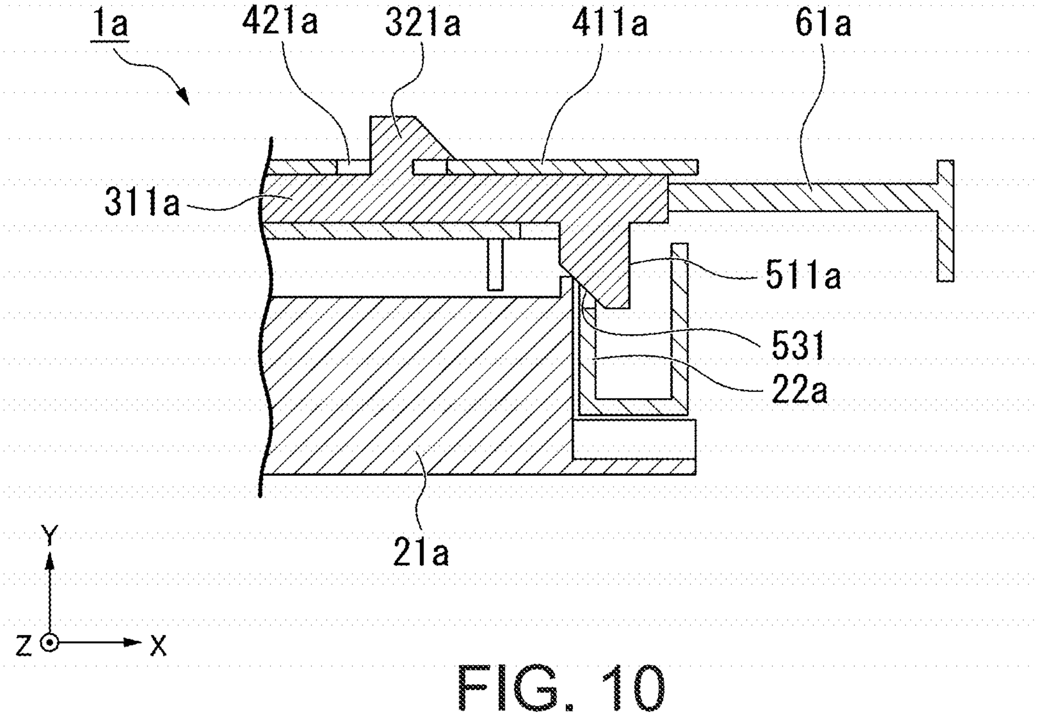
FIG. 10 is a cross-sectional view showing an example of a state in which the a-th unlock button of the a-th recording device according to the second embodiment is pressed by a first amount.

FIG. 10 is a cross-sectional view showing an example of a state where the a-th unlock button 61*a* of the a-th recording device 1*a* according to the second embodiment is pressed by a first amount E1.

Figure 11:
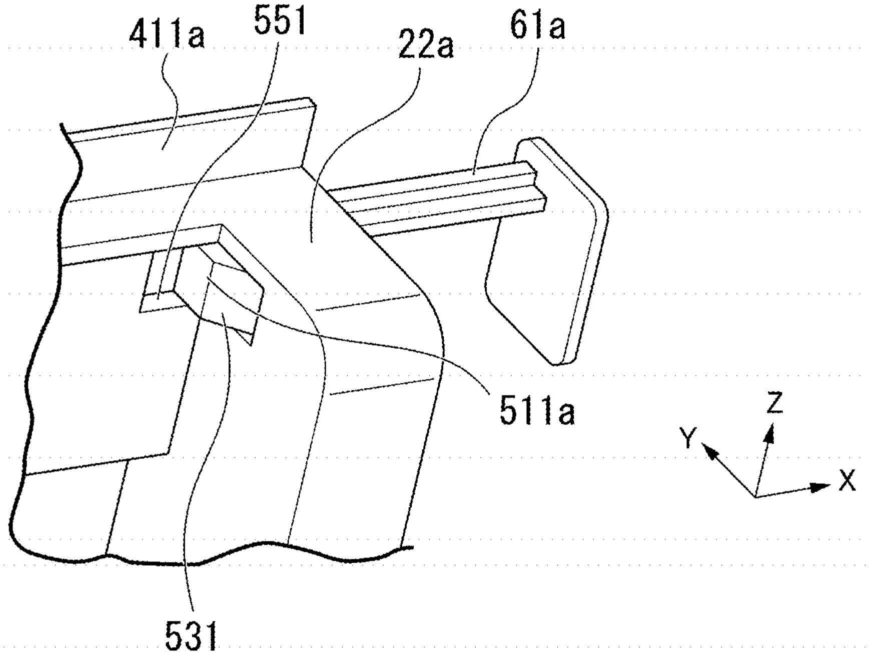
FIG. 11 is an external appearance view showing an example of a state in which the a-th unlock button of the a-th recording device according to the second embodiment is pressed by the first amount.

FIG. 11 is an external appearance view showing an example of a state in which the a-th unlock button 61*a* of the a-th recording device 1*a* according to the second embodiment, is pressed by the first amount E1.

Figure 12:
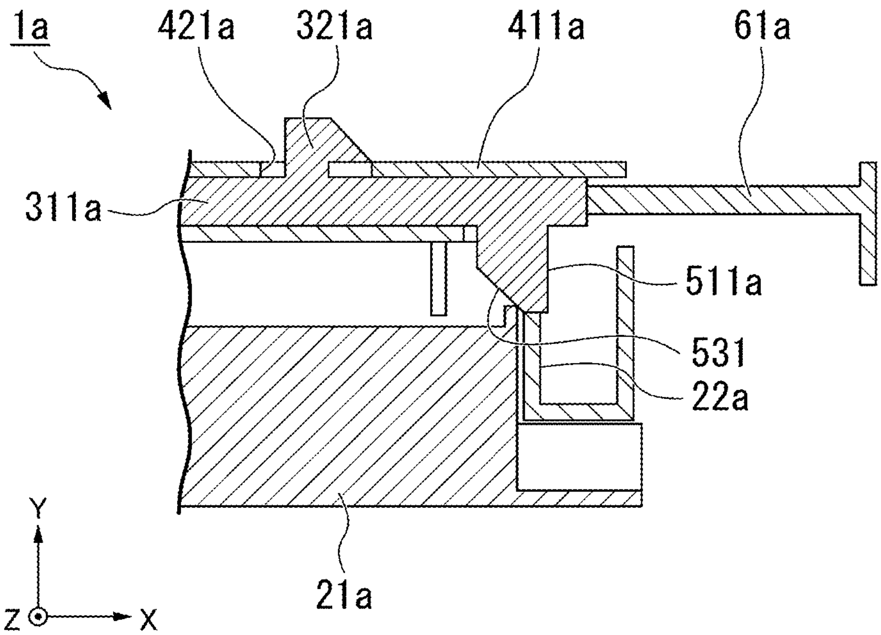
FIG. 12 is a cross-sectional view showing an example of a state where the a-th unlock button of the a-th recording device according to the second embodiment is pressed by a second amount which is larger than the first amount.

In FIGS. 11 and 12, XYZ orthogonal coordinate axes similar to those in FIG. 1 are shown.

Here, FIG. 10 shows a state of transition from the state shown in FIG. 8.

FIG. 11 shows the state of transition from the state shown in FIG. 9 in the same state as FIG. 10.

In the state shown in FIGS. 10 and 11, in response to the a-th lock lever 311*a* being pushed by the a-th unlock button 61*a* to the left by the first amount E1 with respect to the state shown in FIGS. 8 and 9, the a-th restriction section 511*a* is also moved to the left by the first amount E1.

When the a-th restriction section 511*a* moves to the left, the left end of the face of the guide section 531 comes into contact with the a-th outer cover 21*a*. Subsequently, as the a-th restriction section 511*a* moves to the left, the face of the guide section 531 gradually moves the a-th outer cover 21*a* in the opening direction.

In the state shown in FIGS. 10 and 11, the a-th outer cover 21*a* is in a state where it can open by its own weight.

Thus, in the state shown in FIGS. 10 and 11, when the a-th lock lever 311*a* is pressed, the a-th restriction section 511*a* in the form of a projection applies a force to the a-th outer cover 21*a* in the direction in which the a-th outer cover 21*a* opens. In the example of FIG. 10, this orientation is downward in the plane of the paper. Thus, the a-th outer cover 21*a* can be opened before the a-th inner cover 22*a* is opened.

In this embodiment, in this state, a lock section (not shown) for locking the a-th outer cover 21*a* and the a-th inner cover 22*a* is unlocked, so that the a-th outer cover 21*a* can rotate by its own weight.

However, the 1*a*-th hook 321*a* and another hook (not shown) are hooked on the a-th main external structure 411*a*. Therefore, the a-th inner cover 22*a* cannot be opened.

FIG. 12 is a cross-sectional view showing an example of a state in which the a-th unlock button 61*a* of the a-th recording device 1*a* according to the second embodiment is pressed by a second amount E2, which is larger than the first amount E1.

Figure 13:
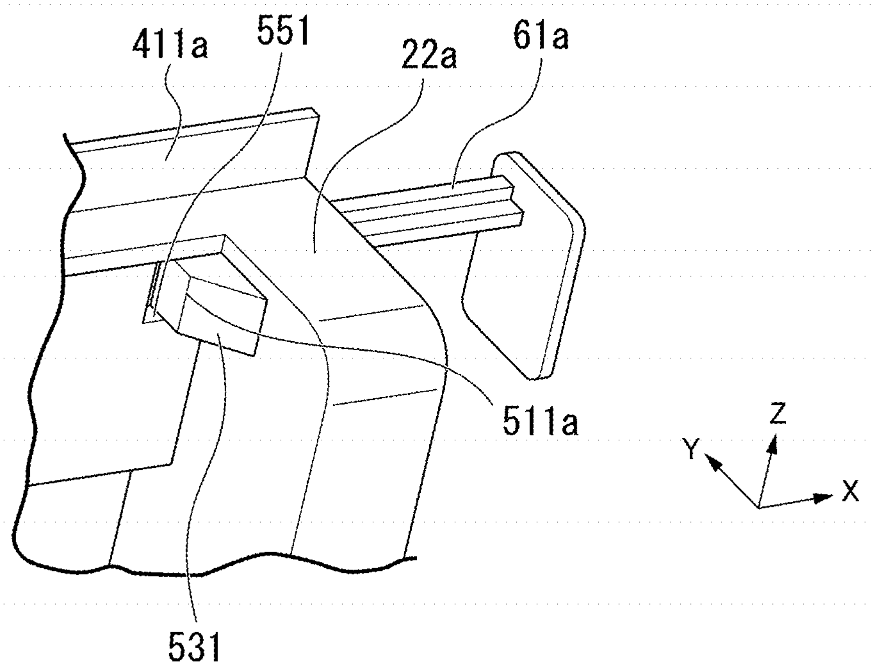
FIG. 13 is an external appearance view showing an example of a state in which the a-th unlock button of the a-th recording device according to the second embodiment is pressed by the second amount larger than the first amount.

FIG. 13 is an external appearance view showing an example of a state where the a-th unlock button 61*a* of the a-th recording device 1*a* according to the second embodiment is pressed by the second amount E2, which is larger than the first amount E1.

In FIGS. 12 and 13, XYZ orthogonal coordinate axes similar to those in FIG. 1 are shown.

Here, FIG. 12 shows a state of transition from the state shown in FIG. 10.

FIG. 13 shows the same state as FIG. 12, which is a state of transition from the state shown in FIG. 11.

In the state shown in FIGS. 12 and 13, in response to the a-th lock lever 311*a* being pushed to the left by the a-th unlock button 61*a* by the second amount E2 with respect to the state shown in FIGS. 8 and 9, the a-th restriction section 511*a* is also moved to the left by the second amount E2.

In the state shown in FIGS. 12 and 13, the a-th inner cover 22*a* can be opened.

In this way, in the state shown in FIGS. 12 and 13, the a-th lock lever 311*a* is pushed to the leftmost position, and the a-th inner cover 22*a* reaches the open position. That is, the 1*a*-th hook 321*a* and another hook (not shown) can be detached from the a-th main external structure 411*a*, whereby the a-th inner cover 22*a* can be opened.

In the present embodiment, the a-th unlock button 61*a* is a button for unlocking the a-th outer cover 21*a* and the a-th inner cover 22*a*.

As described above, in the a-th recording device 1*a* according to the present embodiment, as a configuration in which the a-th outer cover 21*a* and the a-th inner cover 22*a* do not open at the same time, a configuration in which the a-th inner cover 22*a* opens after the a-th outer cover 21*a* opens is adopted.

Therefore, in the a-th recording device 1*a* according to the present embodiment, compared to a case where the a-th outer cover 21*a* and the a-th inner cover 22*a* are opened at the same time, it is possible to reduce the momentum due to their own weight when they are opened. Accordingly, in the a-th recording device 1*a* according to the present embodiment, for example, it is possible to reduce the impact when the a-th outer cover 21*a* and the a-th inner cover 22*a* are opened, and it is possible to reduce the impact noise generated when the a-th outer cover 21*a* and the a-th inner cover 22*a* are opened.

In the a-th recording device 1*a* according to the present embodiment, for example, it is possible to provide a time difference between the time at which each of the a-th outer cover 21*a* and the a-th inner cover 22*a* are opened without adding a component. In the a-th recording device 1*a* according to the present embodiment, the a-th outer cover 21*a* can be opened earlier than the a-th inner cover 22*a* by the guide section 531 of the a-th restriction section 511*a* provided on the a-th lock lever 311*a*, which interlocks with the a-th unlock button 61*a*.

In the a-th recording device 1*a* according to the present embodiment, when the a-th unlock button 61*a* is pressed by the user, both the a-th outer cover 21*a* and the a-th inner cover 22*a* can be opened by one operation.

In the a-th recording device 1*a* according to the present embodiment, since the a-th outer cover 21*a* is opened first and then the a-th inner cover 22*a* is opened, it is possible to reduce the impact noise generated when both the a-th outer cover 21*a* and the a-th inner cover 22*a* are opened.

The housing structure of the a-th recording device 1*a* according to the present embodiment includes a main housing similar to the main housing 11, the a-th outer cover 21*a* that can be opened and closed by rotating around the 1*a*-th axis J1*a*, which extends horizontally with respect to the main housing, the a-th inner cover 22*a* that is located inside of the a-th outer cover 21*a* and that can be opened and closed by rotating around the 2*a*-th axis J2*a*, which is parallel to the 1*a*-th axis J1*a*, with respect to the main housing, a regulation section configured from the a-th lock lever 311*a* and the like that regulates the release of the a-th inner cover 22*a* in a closed state, and the restriction section that restricts the release of regulation by the regulation section when the a-th outer cover 21*a* is closed.

Here, in the present embodiment, an example of the recording device is configured by the a-th recording device 1*a*, an example of the first cover is configured by the a-th outer cover 21*a*, an example of the second cover is configured by the a-th inner cover 22*a*, an example of the first axis is configured by the 1*a*-th axis J1*a*, and an example of the second axis is configured by the 2*a*-th axis J2*a*.

In the present embodiment, similarly to the first embodiment, an example of the regulation section is constituted by the a-th lock lever 311*a* and the like.

In the present embodiment, an example of the restriction section is configured by the a-th restriction section 511*a*. However, another configuration may be used as the restriction section.

Therefore, in the housing structure of the a-th recording device 1*a* according to the present embodiment in a case where the a-th outer cover 21*a* is closed, release of the regulation section is restricted by the restriction section. That is, the a-th inner cover 22*a* cannot be opened. In the housing structure, when the a-th outer cover 21*a* is opened, the regulation section can be released, and the a-th inner cover 22*a* can be opened.

As a result, in the present housing structure, the a-th outer cover 21*a* and the a-th inner cover 22*a* are suppressed from being opened simultaneously, and the momentum when these covers are opened can be suppressed.

In this housing structure, each of the a-th outer cover 21*a* and the a-th inner cover 22*a* may be configured to rotate separately. For example, friction between the a-th outer cover 21*a* and the a-th inner cover 22*a* may further suppress the momentum when these covers are opened.

In this housing structure of the a-th recording device 1*a* according to the present embodiment the regulation section is provided at the a-th inner cover 22*a* and includes a sliding member that can slide with respect to the a-th inner cover 22*a*. The sliding member has an engagement section engageable with the main housing. The restriction section is provided on the sliding member, and when the a-th outer cover

21*a* is closed, restriction section abuts the a-th outer cover 21*a* to restrict the release of regulation by the regulation section.

Here, in the present embodiment, the a-th lock lever 311*a* constitutes an example of a sliding member, and the 1*a*-th hook 321*a* constitutes an engagement section.

Therefore, in the housing structure of the a-th recording device 1*a* according to the present embodiment when the restriction section provided in the sliding member abuts on the a-th outer cover 21*a*, the sliding member cannot slide, and the release of the regulation is restricted.

In the housing structure of the a-th recording device 1*a* according to the present embodiment the restriction section includes the guide section 531 that guides the a-th outer cover 21*a* so that it can be opened by coming into contact with the a-th outer cover 21*a*. After the a-th outer cover 21*a* is opened by the guide section, the engagement of the engagement section with the main housing is released.

Therefore, in the housing structure of the a-th recording device 1*a* according to the present embodiment the a-th outer cover 21*a* is opened by the movement of the sliding member, and the restriction caused by the restriction section is eliminated. Further, by moving the sliding member as it is, the regulation by the sliding member is also released, and the a-th inner cover 22*a* is opened. Thus, the a-th outer cover 21*a* and the a-th inner cover 22*a* can be opened at different times, and both the a-th outer cover 21*a* and the a-th inner cover 22*a* can be opened by only the sliding movement of the sliding member. Therefore, the a-th outer cover 21*a* and the a-th inner cover 22*a* can be easily opened and closed.

Note that, in the present embodiment, a case where the a-th restriction section 511*a* has the guide section 531 formed by an inclined surface is shown, but another configuration may be used. For example, a configuration may be used in which such an inclined surface is not provided and the a-th restriction section 511*a* simply abuts against the a-th outer cover 21*a* to prevent the a-th outer cover 21*a* from opening.

The shape of the restriction section is not necessarily limited to the shape of the present embodiment, and various shapes may be used.

A Third Embodiment Will be Described

A b-th recording device 1*b* according to the third embodiment will be described with reference to FIGS. 14 to 17. In the present embodiment, detailed description of the same components as those of the recording device 1 according to the first embodiment will be omitted, and components different from those of the first embodiment will be described in detail.

Here, the configuration of the b-th recording device 1*b* according to the third embodiment is schematically different from that of the recording device 1 in the configuration of the attachment section between a b-th outer cover 21*b* and a b-th inner cover 22*b*.

Therefore, in each of FIGS. 14 to 17, only the components in the vicinity of the attachment section according to the present embodiment that are different from those of the first embodiment are shown. For example, the components on the back side thereof are not shown. Although FIGS. 14 to 17 show the configuration section in the vicinity of the left attachment section from amongst the left and right attachment sections, the configuration in the vicinity of the right attachment section is bilaterally symmetrical and similar.

Figure 14:
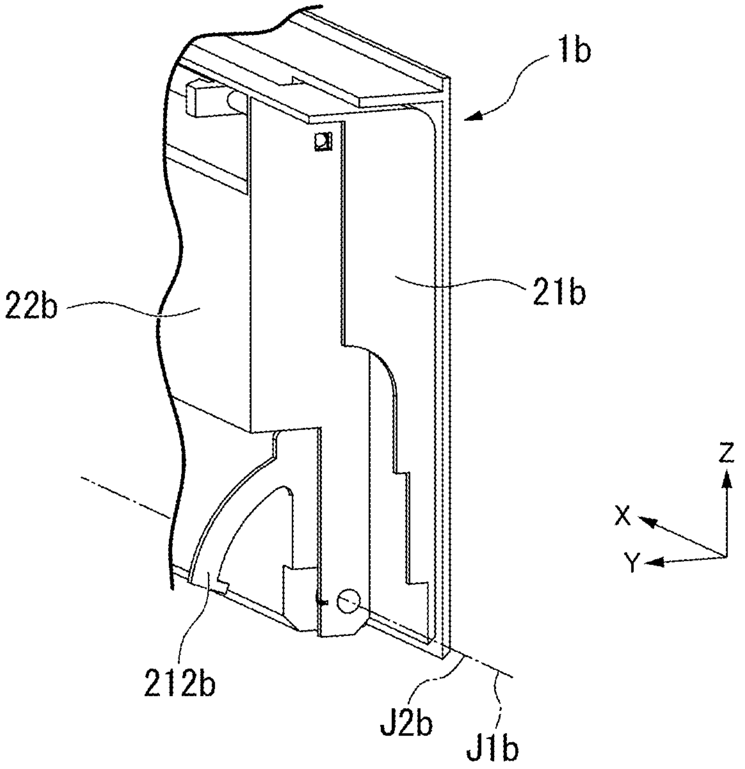
FIG. 14 is an external appearance view showing an example of an attachment section between the b-th outer cover and the b-th inner cover of the b-th recording device according to the third embodiment.

FIG. 14 is an external appearance view showing an example of an attachment section between the b-th outer cover 21*b* and the b-th inner cover 22*b* of the b-th recording device 1*b* according to the third embodiment.

FIG. 14 shows XYZ orthogonal coordinate axes similar to those in FIG. 1.

FIG. 14 shows the b-th outer cover 21*b*, a 2*b*-th arm section 212*b* of the b-th outer cover 21*b*, the b-th inner cover 22*b*, a 1*b*-th axis Jib, and a 2*b*-th axis J2*b*.

In the example of FIG. 14, illustration of components of the b-th recording device 1*b* on the inner side of the b-th inner cover 22*b* is omitted.

Here, these configurations are the same as the configurations of the outer cover 21, the second arm section 212 of the outer cover 21, the inner cover 22, the first axis J1, and the second axis J2 according to the first embodiment, except for the configuration of the attachment section between the b-th outer cover 21*b* and the b-th inner cover 22*b*.

Figure 15:
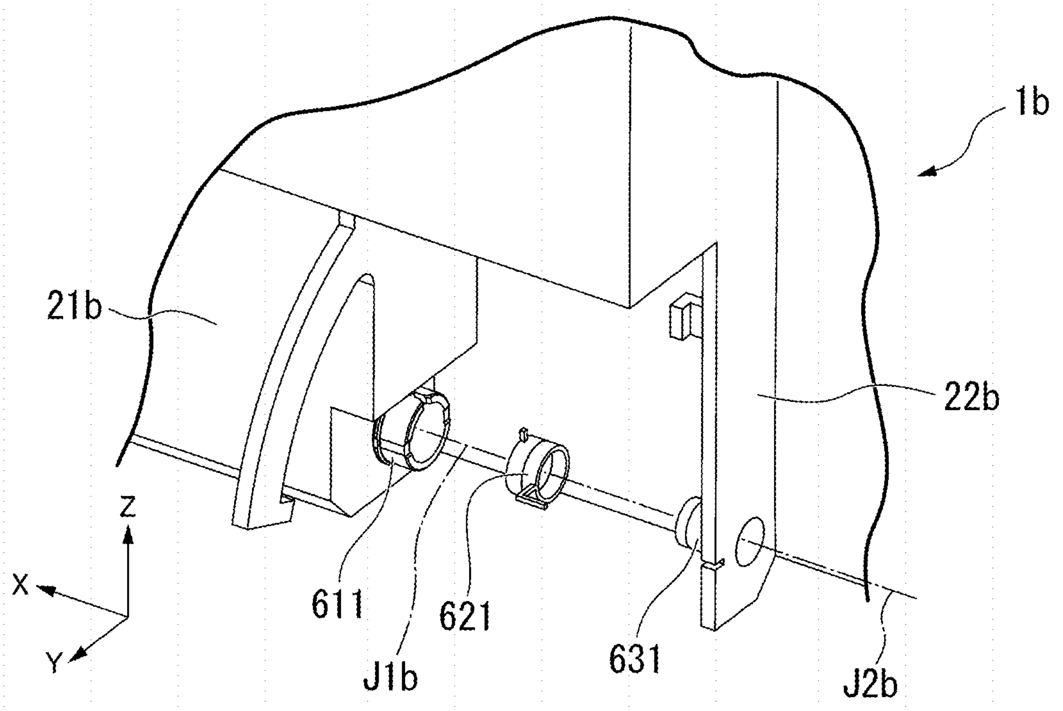
FIG. 15 is an exploded view showing an example of an attachment section between the b-th outer cover and the b-th inner cover of the b-th recording device according to the third embodiment.

Components of the b-th recording device 1*b* which are not shown in FIGS. 14 and 15 are the same as the components of the recording device 1 according to the first embodiment.

FIG. 15 is an exploded view showing an example of an attachment section between the b-th outer cover 21*b* and the b-th inner cover 22*b* of the b-th recording device 1*b* according to the third embodiment.

FIG. 15 shows XYZ orthogonal coordinate axes similar to those in FIG. 1.

FIG. 15 shows the b-th outer cover 21*b*, the b-th inner cover 22*b*, the 1*b*-th axis Jib, and the 2*b*-th axis J2*b*.

In the example of FIG. 15, components around the rotation axes of the b-th outer cover 21*b* and the b-th inner cover 22*b* are shown.

FIG. 15 shows a spring holding section 611 provided on the b-th outer cover 21*b*, a torsion spring 621 fitted to the spring holding section 611, and a shaft section 631 provided on the b-th inner cover 22*b*, as components of the attachment section between the b-th outer cover 21*b* and the b-th inner cover 22*b*.

The spring holding section 611 is provided at a horizontally lower left end portion of the b-th outer cover 21*b* and has a substantially cylindrical shape protruding toward the b-th inner cover 22*b*. The spring holding section 611 has a shape into which the torsion spring 621 can be fitted.

The shaft section 631 is provided on a lower left inner surface of the b-th inner cover 22*b*, and has a cylindrical shape protruding toward the b-th outer cover 21*b*. The shaft section 631 is fitted into the torsion spring 621.

The torsion spring 621 has a substantially cylindrical shape, and is fitted inside the substantially cylindrical portion of the spring holding section 611, and is fitted outside the substantially cylindrical portion of the shaft section 631.

In this example, the torsion spring 621 is coaxially mounted onto the shaft section 631, which extends from the b-th inner cover 22*b*, and these are inserted into the spring holding section 611 of the b-th outer cover 21*b*. One end of the torsion spring 621 is hooked on the b-th outer cover 21*b*, and the other end is hooked on the b-th inner cover 22*b*.

Here, the direction in which the substantially cylindrical shape of the spring holding section 611 protrudes, the direction in which the substantially cylindrical shape of the torsion spring 621 protrudes, and the direction in which the cylindrical shape of the shaft section 631 protrudes are all parallel to the 1*b*-th axis Jib and the 2*b*-th axis J2*b*. The 1*b*-th axis Jib and the 2*b*-th axis J2*b* pass through the centers of the circles of these cylindrical shapes.

Figure 16:
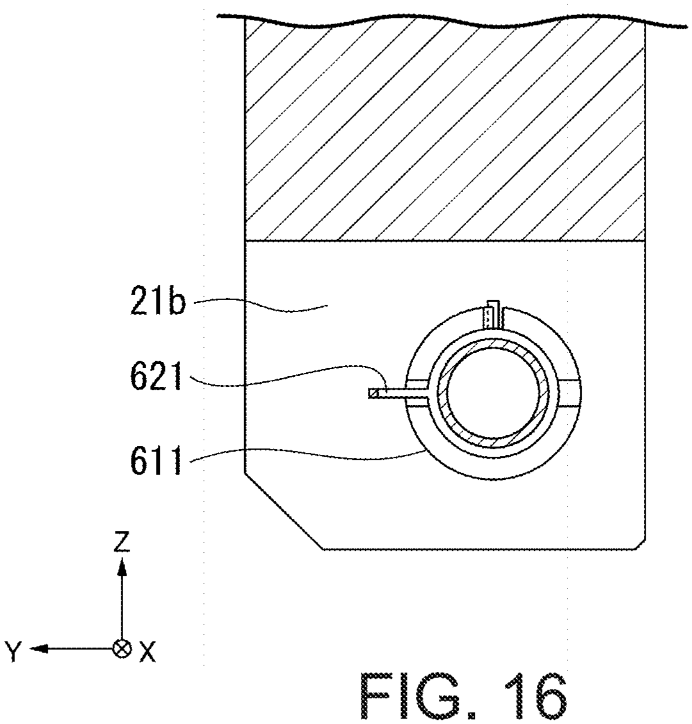
FIG. 16 is a view showing an example of a state in which the b-th outer cover of the b-th recording device according to the third embodiment is closed.

FIG. 16 is a view showing an example of a state where the b-th outer cover 21*b* of the b-th recording device 1*b* according to the third embodiment is closed.

Figure 17:
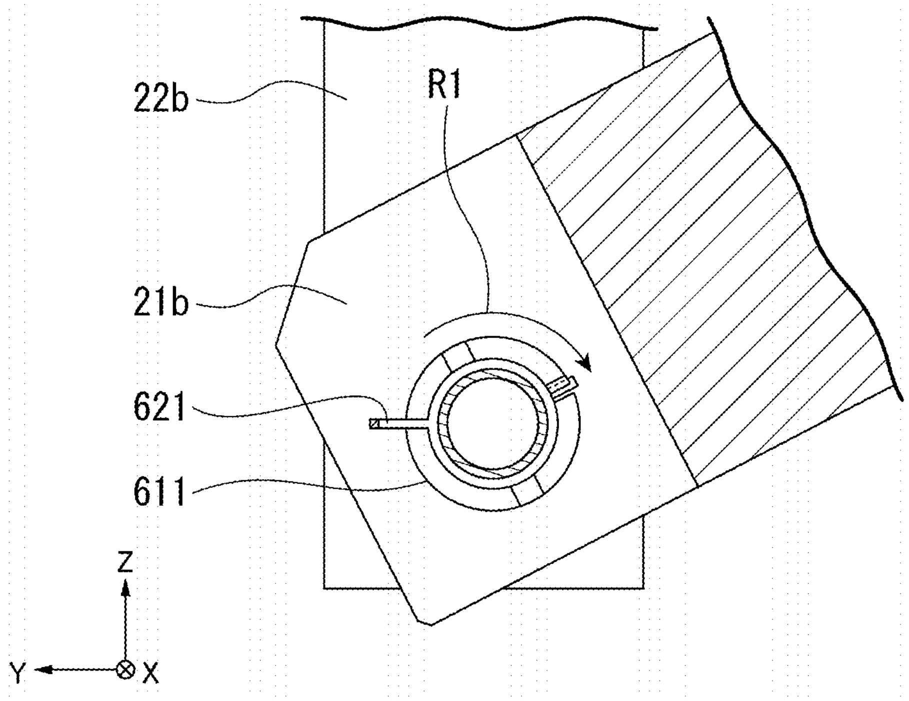
FIG. 17 is a view showing an example of a state in which the b-th outer cover of the b-th recording device according to the third embodiment is opened.

FIG. 17 is a view showing an example of a state where the b-th outer cover 21*b* of the b-th recording device 1*b* according to the third embodiment is open.

In FIGS. 16 and 17, XYZ orthogonal coordinate axes similar to those in FIG. 1 are shown.

FIG. 17 shows a rotational direction Ri in which the spring holding section 611 rotates when the b-th outer cover 21*b* opens.

In the state shown in FIG. 16, the b-th outer cover 21*b* and the b-th inner cover 22*b* are closed. The torsion spring 621 is wound and assembled so that the diameter of the spring is reduced, and the shaft section 631 is held tight so as to regulate its rotation.

In the state shown in FIG. 17, the b-th outer cover 21*b* is opened. When the b-th outer cover 21*b* is opened, the load of the torsion spring 621 is reduced, and a diameter of the torsion spring 106 increases. As a result, the b-th inner cover 22*b* starts to rotate after the b-th outer cover 21*b* is opened, and the b-th outer cover 21*b* and the b-th inner cover 22*b* are opened at different times so that generation of a large noise is suppressed.

As described above, in the b-th recording device 1*b* according to the present embodiment, as a configuration in which the b-th outer cover 21*b* and the b-th inner cover 22*b* are not opened simultaneously, a configuration in which the b-th inner cover 22*b* is opened after the b-th outer cover 21*b* is opened is adopted.

Therefore, in the b-th recording device 1*b* according to the present embodiment, compared to a case where the b-th outer cover 21*b* and the b-th inner cover 22*b* are opened simultaneously, it is possible to reduce the momentum due to the own weight when the b-th outer cover 21*b* and the b-th inner cover 22*b* are opened. Accordingly, in the b-th recording device 1*b* according to the present embodiment, for example, it is possible to reduce the impact when the b-th outer cover 21*b* and the b-th inner cover 22*b* are opened, and it is possible to reduce the impact noise generated when the b-th outer cover 21*b* and the b-th inner cover 22*b* are opened.

In the b-th recording device 1*b* according to the present embodiment, by regulating the rotation of the b-th inner cover 22*b* until the b-th outer cover 21*b* is open using the torsion spring 621, it is possible to provide a time difference in the timing at which the b-th outer cover 21*b* and the b-th inner cover 22*b* are opened.

As described above, the b-th recording device 1*b* according to the present embodiment further includes the torsion spring 621 provided around the 2*b*-th axis J2*b*. When the difference in phase between the b-th outer cover 21*b* and the b-th inner cover 22*b* is small, the torsion spring 621 applies a large load to the 2*b*-th axis J2*b*. On the other hand, when the difference in phase is large, the load on the 2*b*-th axis J2*b* is small.

Therefore, in the b-th recording device 1*b* according to the present embodiment, by changing the ease of rotation of the b-th inner cover 22*b* according to the difference in phase between the b-th outer cover 21*b* and the b-th inner cover 22*b* using the torsion spring 621, it is possible to more effectively provide a time difference between the opening and closing of the b-th outer cover 21*b* and the b-th inner cover 22*b*. Because the b-th inner cover 22*b* is opened while the b-th outer cover 21*b* is opened, the difference in phase between the b-th outer cover 21*b* and the b-th inner cover 22*b* is reduced, so that the load on the shaft section 631 is increased and the b-th inner cover 22*b* can be decelerated. Therefore, the impact noise generated when the b-th inner cover 22*b* is opened can be reduced more effectively.

For example, the configuration described in the third embodiment may be applied to the recording device 1 according to the first embodiment, to the a-th recording device 1*a* according to the second embodiment, or to another recording device.

A Fourth Embodiment Will be Described

A c-th recording device 1*c* according to the fourth embodiment will be described with reference to FIGS. 18 and 19. In the present embodiment, detailed description of the same components as those of the recording device 1 according to the first embodiment will be omitted, and components different from those of the first embodiment will be described in detail.

Here, schematically, the configuration of the c-th recording device 1*c* according to the fourth embodiment includes a lock section between the c-th outer cover 21*c* and the c-th inner cover 22*c*, compared to the configuration of the recording device 1 according to the first embodiment.

Figure 18:
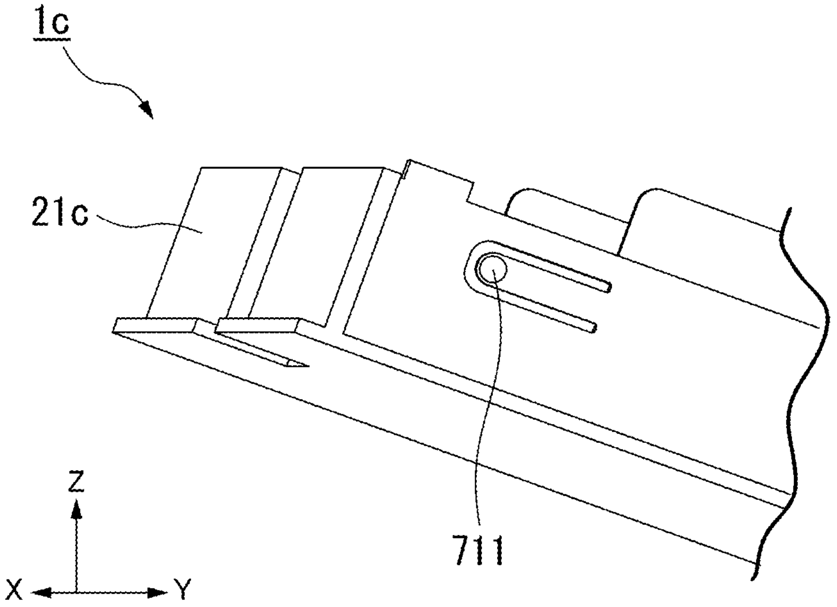
FIG. 18 is a view showing an example of a first convex section in a lock section between a c-th outer cover and a c-th inner cover of the c-th recording device according to the fourth embodiment.
Figure 19:
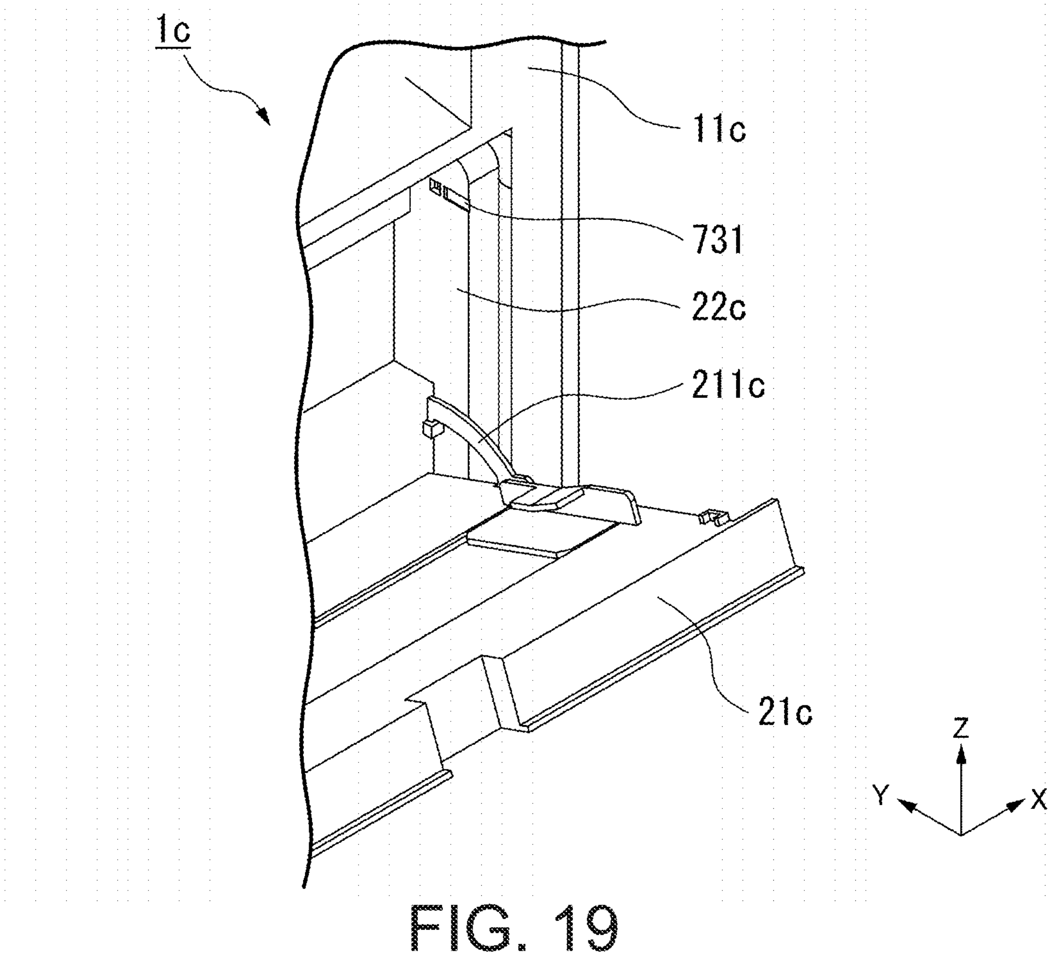
FIG. 19 is a view showing an example of a first recess section in a lock section between a c-th outer cover and a c-th inner cover of a c-th recording device according to the fourth embodiment.

For this reason, FIGS. 18 and 19 show only the components in the vicinity of the lock section according to the present embodiment that are different from those of the first embodiment. Although FIGS. 18 and 19 show the configuration section in the vicinity of the right lock section from amongst the left and right lock sections, the configuration in the vicinity of the left lock section is bilaterally symmetrical and similar.

FIG. 18 is a view showing an example of a first convex section 711 in the lock section between the c-th outer cover 21*c* and the c-th inner cover 22*c* of the c-th recording device 1*c* according to the fourth embodiment.

FIG. 18 shows XYZ orthogonal coordinate axes similar to those in FIG. 1.

FIG. 18 shows, in a state in which the c-th outer cover 21*c* is opened, a state in which a part of the c-th outer cover 21*c* is viewed obliquely from the right front.

The c-th outer cover 21*c* is provided with the first convex section 711 protruding to the right side in the vicinity of the tip on the outer surface of the end portion on the right side.

Here, although not shown in FIG. 18, the c-th outer cover 21*c* is similarly provided with a convex section protruding to the left side in the vicinity of the tip on the outer surface of the end section on the left side.

FIG. 19 is a view showing an example of a first recess section 731 in a lock section between a c-th outer cover 21*c* and a c-th inner cover 22*c* of a c-th recording device 1*c* according to the fourth embodiment.

FIG. 19 shows XYZ orthogonal coordinate axes similar to those in FIG. 1.

FIG. 19 shows a state where the vicinity of the right end of the c-th inner cover 22*c* is viewed obliquely from the left front in a state in which the c-th outer cover 21*c* is opened and the c-th inner cover 22*c* is closed.

The c-th inner cover 22*c* includes the first recess section 731 recessed to the right side in the vicinity of the distal end on the inner surface of the right end portion.

Here, although not shown in FIG. 19, the c-th inner cover 22*c* is similarly provided with a recess section recessed to the left side in the vicinity of the distal end on the inner surface of the end section on the left side.

In a state where the c-th outer cover 21*c* and the c-th inner cover 22*c* are closed, the first convex section 711 on the right side of the c-th outer cover 21*c* and the first recess section 731 on the right side of the c-th inner cover 22*c* are engaged and fixed by one fitting into the other. Similar to the right side, the convex section on the left side of the c-th outer cover 21*c* and the recess section on the left side of the c-th inner cover 22*c* are engaged and fixed by one fitting into the other.

Such fixation is released when a predetermined force is applied toward opening the c-th outer cover 21*c*.

For example, the c-th outer cover 21*c* and the c-th inner cover 22*c* are both made of resin. A part of the c-th outer cover 21*c* and *c*-th inner cover 22*c* made of resin is formed with a convex section and a recess section as a shape having elasticity. When the convex section and recess section are fitted to each other, the c-th outer cover 21*c* and the c-th inner cover 22*c* are held in a closed state. In this case, the elasticity of the resin is set so as to be easily released by, for example, a user applying a force.

Here, the configurations of a c-th main housing 11*c*, the c-th outer cover 21*c*, the c-th inner cover 22*c*, and a 1*c*-th arm section 211*c* shown in FIGS. 18 and 19 are substantially the same as the configurations of the main housing 11, the outer cover 21, the inner cover 22, and the first arm section 211 according to the first embodiment, except for the two convex sections including the first convex section 711*d* and the two recess sections including the first recess section 731 that constitute the lock section and that are located between the c-th outer cover 21*c* and the c-th inner cover 22*c*.

Components of the c-th recording device 1*c* which are not shown in FIGS. 18 and 19 are the same as the components of the recording device 1 according to the first embodiment.

As described above, in the c-th recording device 1*c* according to the present embodiment, in a state in which the c-th outer cover 21*c* and the c-th inner cover 22*c* are closed, the c-th outer cover 21*c* and the c-th inner cover 22*c* can be locked.

Therefore, in the c-th recording device 1*c* according to the present embodiment, it is possible to prevent the c-th outer cover 21*c* from opening by its own weight in a state in which such force for releasing the lock is not applied.

In the c-th recording device 1*c* according to the present embodiment, the c-th outer cover 21*c* and the c-th inner cover 22*c* may be engaged with each other.

Therefore, by engaging the c-th outer cover 21*c* and the c-th inner cover 22*c* in the c-th recording device 1*c* according to the present embodiment, it is possible to suppress unintentional opening of the c-th outer cover 21*c*. On the other hand, when the c-th inner cover 22*c* is opened, the c-th outer cover 21*c* is easily opened at the same time. However, for example, by combining with the configuration according to the other embodiment described above, it is possible to suppress the momentum when the c-th outer cover 21*c* and the c-th inner cover 22*c* are opened.

For example, the configuration described in the fourth embodiment may be applied to either recording device 1 according to the first embodiment, the a-th recording device 1*a* according to the second embodiment and the b-th recording device 1*b* according to the third embodiment or may be applied to another recording device.

A Fifth Embodiment Will be Described

A d-th recording device 1*d* according to the fifth embodiment will be described with reference to FIGS. 20 and 21. In the present embodiment, detailed description of the same components as those of the recording device 1 according to the first embodiment will be omitted, and components different from those of the first embodiment will be described in detail.

Here, the configuration of the d-th recording device 1*d* according to the fifth embodiment, is schematically different from the configuration of the recording device 1 according to the first embodiment in that the opening angles of the d-th outer cover 21*d* and the d-th inner cover 22*d* are set in a predetermined mode.

Figure 20:
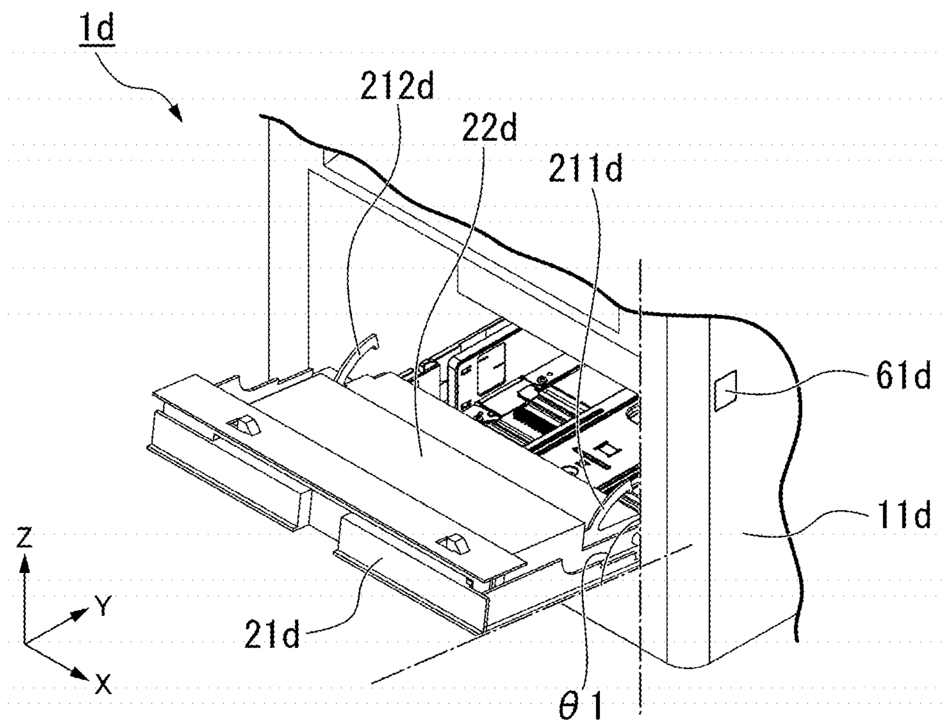
FIG. 20 is a view showing an example of the first open angle in a state where the d-th outer cover and the d-th inner cover of the d-th recording device according to the fifth embodiment are opened.
Figure 21:
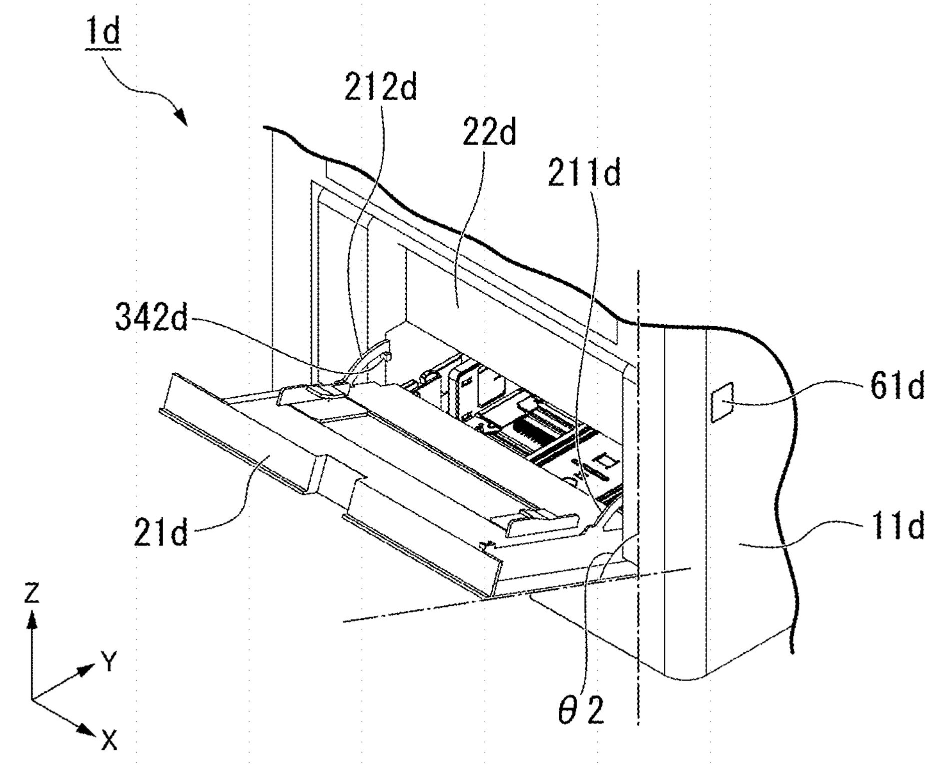
FIG. 21 is a view showing an example of a second open angle in a state where the d-th outer cover is opened and the d-th inner cover is closed in the d-th recording device according to the fifth embodiment.

Therefore, FIGS. 20 and 21 show only the opening angles of the d-th outer cover 21*d* and the d-th inner cover 22*d* according to the present embodiment that are different from those of the first embodiment.

FIG. 20 is a view showing an example of the first open angle θ1 in a state where the d-th outer cover 21*d* and the d-th inner cover 22*d* of the d-th recording device 1*d* according to the fifth embodiment are opened.

FIG. 21 is a view showing an example of the second open angle θ2 in a state where the d-th outer cover 21*d* is open and the d-th inner cover 22*d* is closed in the d-th recording device 1*d* according to the fifth embodiment.

In FIGS. 20 and 21, XYZ orthogonal coordinate axes similar to those in FIG. 1 are shown.

Here, the first and second open angles θ1 and θ2 are angles of the front face of the d-th outer cover 21*d* with respect to the front face of a d-th main housing 11*d*.

In the present embodiment, the first open angle θ1 corresponds to the maximum opening angle of the d-th outer cover 21*d* and the d-th inner cover 22*d* with respect to the d-th main housing 11*d*. The second open angle θ2 corresponds to the maximum angle between the d-th outer cover 21*d* and the d-th inner cover 22*d*.

Then, the first open angle θ1 is greater than the second open angle θ2.

Here, the configurations of the d-th main housing 11*d*, the d-th outer cover 21*d*, the d-th inner cover 22*d*, a 1*d*-th arm section 211*d*, a 2*d*-th arm section 212*d*, a 2*d*-th protrusion 342*d*, and a d-th unlock button 61*d* shown in FIGS. 20 and 21 are substantially the same as the configurations of the main housing 11, the outer cover 21, the inner cover 22, the first arm section 211, the second arm section 212, the second protrusion 342, and the unlock button 61 according to the first embodiment except for the opening angles of the d-th outer cover 21*d* and the d-th inner cover 22*d*.

The components of the d-th recording device 1*d* that are not shown in FIGS. 20 and 21 are the same as the components of the recording device 1 according to the first embodiment.

As described above, in the d-th recording device 1*d* according to the present embodiment, the maximum opening angle of the d-th outer cover 21*d* and the d-th inner cover 22*d* with respect to the d-th main housing 11*d* is larger than the maximum angle between the d-th outer cover 21*d* and the d-th inner cover 22*d*.

Therefore, in the d-th recording device 1*d* according to the present embodiment, because the opening angle of the d-th inner cover 22*d* is larger than the maximum angle between the d-th outer cover 21*d* and the d-th inner cover 22*d*, it is easy to access the d-th main housing 11*d* while setting the angle of the d-th outer cover 21*d* to the second open angle θ2, which is suitable for placing a medium. At this time, the open angle when the d-th outer cover 21*d* and the d-th inner cover 22*d* are opened becomes large. Therefore, the momentum when the d-th outer cover 21*d* and the d-th inner cover 22*d* are opened tends to increase. That is, in order to suppress an increase in momentum, it is more effective to provide a time difference between opening and closing of the d-th outer cover 21*d* and the d-th inner cover 22*d*.

Here, in the present embodiment, the second open angle θ2, which is the maximum angle between the d-th outer cover 21*d* and the d-th inner cover 22*d*, is the medium placing angle of the d-th outer cover 21*d*.

The configuration described in the fifth embodiment may be applied to, for example, any one of the recording device 1 according to the first embodiment the a-th recording device 1*a* according to the second embodiment the b-th recording device 1*b* according to the third embodiment and the c-th recording device 1*c* according to the fourth embodiment or may be applied to other recording devices.

A Sixth Embodiment Will be Described

An e-th recording device 1*e* according to the sixth embodiment will be described with reference to FIG. 22.

In the present embodiment, detailed description of the same components as those of the recording device 1 according to the first embodiment will be omitted, and components different from those of the first embodiment will be described in detail.

Here, the configuration of the e-th recording device 1*e* according to the sixth embodiment is schematically different from the configuration of the recording device 1 according to the first embodiment when the e-th inner cover 22*e* is opened up while the e-th outer cover 21*e* is open.

Figure 22:
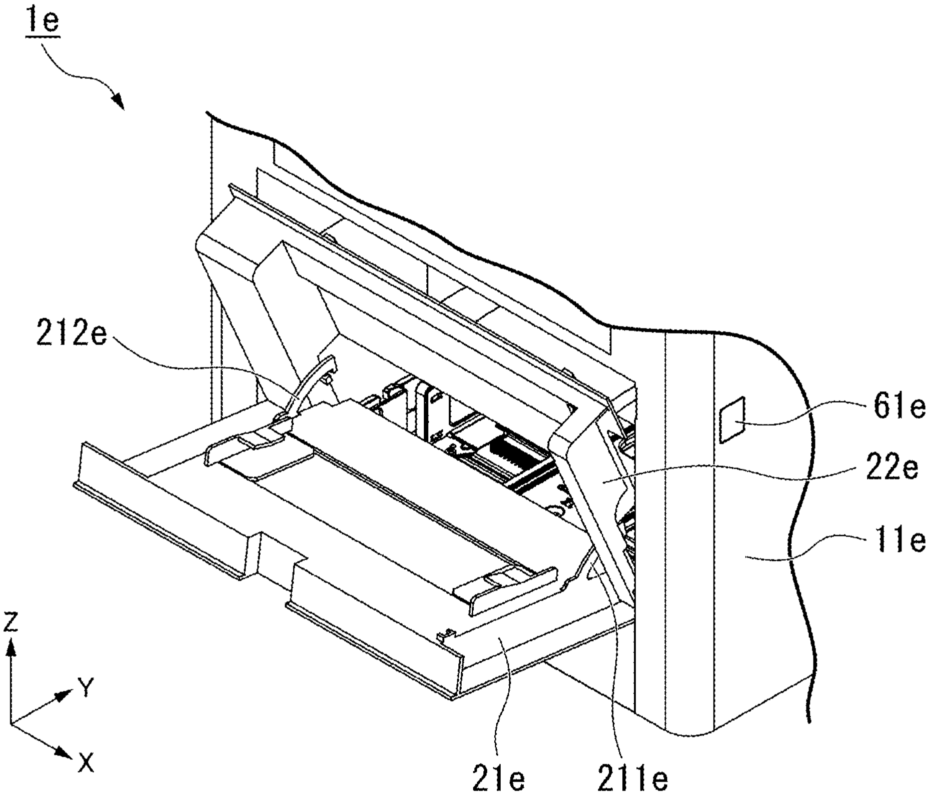
FIG. 22 is a view showing an example of a state when an e-th inner cover is opened in a state where an e-th outer cover of an e-th recording device according to a sixth embodiment is opened.

Therefore, FIG. 22 shows only components in the vicinity of the e-th outer cover 21*e* and the e-th inner cover 22*e* according to the present embodiment that are different from those of the first embodiment.

FIG. 22 is a view showing an example of a situation when the e-th inner cover 22*e* is opened up while the e-th outer cover 21*e* of the e-th recording device 1*e* according to the sixth embodiment is open.

FIG. 22 shows XYZ orthogonal coordinate axes similar to those in FIG. 1.

As shown in FIG. 22, in the present embodiment, when the e-th inner cover 22*e* is opened while the e-th outer cover 21*e* is open, the e-th outer cover 21*e* and the e-th inner cover 22*e* are stopped by friction between the e-th outer cover 21*e* and the e-th inner cover 22*e*, in a state where the e-th outer cover 21*e* and the e-th inner cover 22*e* are separated from each other. This friction is generated at surfaces where the e-th outer cover 21*e* and the e-th inner cover 22*e* contact each other.

Here, the configuration of an e-th main housing 11*e*, the e-th outer cover 21*e*, the e-th inner cover 22*e*, a 1*e*-th arm section 211*e*, a 2*e*-th arm section 212*e*, and an e-th unlock button 61*e* shown in FIG. 22, is roughly the same as the configuration of the main housing 11, the outer cover 21, the inner cover 22, the first arm section 211, the second arm section 212, and the unlock button 61 according to the first embodiment, except for the situation when the e-th inner cover 22*e* is opened while the e-th outer cover 21*e* is open.

Components of the e-th recording device 1*e* that are not shown in FIG. 22 are the same as the components of the recording device 1 according to the first embodiment.

As described above, in the e-th recording device 1*e* according to the present embodiment, when the e-th inner cover 22*e* is opened while the e-th outer cover 21*e* is open, the e-th outer cover 21*e* and the e-th inner cover 22*e* are stopped by the friction between the e-th outer cover 21*e* and the e-th inner cover 22*e*, in a state in which the e-th outer cover 21*e* and the e-th inner cover 22*e* are separated from each other.

Therefore, in the e-th recording device 1*e* according to the present embodiment, when the e-th inner cover 22*e* is opened in a state in which the e-th outer cover 21*e* is open, the e-th outer cover 21*e* and the e-th inner cover 22*e* stop by the friction between them, in a state of being separated from each other, and thus it is possible to suppress overall collision. Thus, in the present embodiment, it is possible to more effectively suppress the generation of noise.

Here, after the e-th inner cover 22*e* stops by friction, in a state of being separated from the e-th outer cover 21*e*, for example, the e-th inner cover 22*e* can be opened to a larger open angle by the user's manual force. The opening angle may be, for example, the same as the opening angle of the e-th outer cover 21*e*.

Such a configuration includes, for example, a case where the opening operation of the e-th inner cover 22*e* is performed in a state in which the e-th outer cover 21*e* is completely opened, or a case in which the e-th outer cover 21*e* and the e-th inner cover 22*e* perform an operation of opening in parallel with a time difference.

For example, the configuration described in the sixth embodiment may be applied to either of the recording device 1 according to the first embodiment, the a-th recording device 1*a* according to the second embodiment, the b-th recording device 1*b* according to the third embodiment, the c-th recording device 1*c* according to the fourth embodiment, and the d-th recording device 1*d* according to the fifth embodiment, or may be applied to other recording devices.

Although the embodiments have been described in detail with reference to the drawings, specific configurations are not limited to the embodiments, and designs and the like within the scope not departing from the gist of the present disclosure are also included.

Configuration Examples Will be Described Below

Note that a lower-level configuration example may or may not be applied to a higher-level configuration example.

A lower-level configuration example applicable to any of the two or more higher-level configuration examples may be applied to any configuration example of the two or more higher-level configuration examples, that is, two or more application examples may occur, and a configuration example lower than the lower-level configuration example may be applied to any application example of the two or more application examples.

Configuration Example 1

The housing structure includes a main housing, a first cover configured to open and close by rotating about a first axis along a horizontal direction with respect to the main housing, a second cover provided further inside than the first cover and configured to open and close together with the first cover by rotating around a second axis parallel to the first axis with respect to the main housing, a regulation section configured to regulate the second cover in a closed state in which the second cover is closed; and a restriction section configured to restrict the release of the regulation by the regulation section when the first cover is closed.

Configuration Example 2

The housing structure, according to the configuration example 1, further includes an operation section configured to displace the regulation section from a regulation position at which the second cover is regulated as the closed state to a release position at which the regulation of the second cover is released, wherein the restriction section is provided on the first cover and when the first cover is closed, displacement of the regulation section from the regulation position to the releasing position by the operation section is limited.

Configuration Example 3

The housing structure, according to the configuration example 2, wherein the regulation section includes a sliding member that is provided on the second cover and that is slidable with respect to the second cover, the sliding member includes an engagement section engageable with the main housing, the operation section is configured to slide the sliding member by abutting and displacing the sliding member, and the restriction section is interposed between the operation section and the sliding member when the first cover is closed.

Configuration Example 4

The housing structure, according to the configuration example 1, wherein the regulation section includes a sliding member that is provided on the second cover and that is slidable with respect to the second cover, the sliding member includes an engagement section engageable with the main housing, the restriction section is provided on the sliding member, when the first cover is closed, the release of regulation by the regulation section is restricted by contact with the first cover.

Configuration Example 5

The housing structure, according to the configuration example 4, wherein the restriction section includes a guide section configured to guide the first cover so that it opens by contacting the first cover and after the first cover is opened by the guide section, the engagement of the engagement section with the main housing is released.

Configuration Example 6

The housing structure, according to any one of the configuration examples 3 to 5, wherein the sliding member includes a second engagement section configured to engage the main housing and the engagement section and the second engagement section are positioned in a longitudinal direction of the sliding member.

Configuration Example 7

The housing structure, according to any one of the configuration examples 1 to 6, wherein the first cover and the second cover are engageable with each other.

Configuration Example 8

The housing structure, according to any one of the configuration examples 3 to 6, wherein the sliding member is configured to slide in parallel with the first axis and the second axis.

Configuration Example 9

The housing structure, according to any one of the configuration examples 1 to 8, wherein the first axis and the second axis are coaxial.

Configuration Example 10

The housing structure, according to the configuration example 9, further includes a torsion spring provided around the second axis, wherein the torsion spring is set, when the phase difference between the first cover and the second cover is small, the load on the second axis increases, and when the phase difference is large, the load on the second axis decreases.

Configuration Example 11

The housing structure, according to any one of the configuration examples 1 to 10, wherein a maximum opening angle of the first cover and second cover with respect to the main housing is larger than a maximum angle between the first cover and the second cover.

Configuration Example 12

The housing structure, according to any one of the configuration examples 1 to 11, wherein when the second cover is opened in a state where the first cover is opened, the first cover and the second cover are stopped in a state where the first cover and the second cover are separated from each other by friction between the first cover and the second cover.

Configuration Example 13

A recording device includes the housing structure, according to any one of the configuration examples 1 to 12, and a recording section that is accommodated in the main housing and performs recording on a medium.

Configuration Example 14

A recording device, according to the configuration example 13, further includes a detachable and attachable section which a developer unit containing a developer configured to be attached to or detached from, wherein the second cover is a cover that covers the detachable and attachable section and the first cover is a placement section on which a medium to be recorded by the recording section is placed.

What is claimed is:

1. A housing structure comprising:

a main housing;

a first cover configured to open and close by rotating with respect to the main housing about a first axis along a horizontal direction;

a second cover provided further inside than the first cover and configured to open and close with respect to the main housing together with the first cover by rotating around a second axis parallel to the first axis;

a regulation section configured to regulate the second cover in a closed state in which the second cover is closed;

an operation section configured to displace the regulation section from a regulation position in which the second cover is regulated in the closed state to a release position in which the regulation of the second cover is released; and a restriction section configured to, when the first cover is closed, restrict the displacement of the regulation section from the regulation position to the release position, wherein the restriction section is on the first cover.

2. The housing structure, according to claim 1, wherein the regulation section includes a sliding member that is provided on the second cover and that is slidable with respect to the second cover, the sliding member includes a first engagement section engageable with the main housing, the operation section is further configured to slide the sliding member by abutting and displacing the sliding member, and when the first cover is closed, the restriction section is interposed between the operation section and the sliding member.

3. The housing structure, according to claim 1, wherein the regulation section includes a sliding member that is provided on the second cover and that is slidable with respect to the second cover, the sliding member includes an engagement section engageable with the main housing, the restriction section is provided on the sliding member, and further restricts release of regulation of the regulation section by contact with the first cover when the first cover is closed.

4. The housing structure, according to claim 3, wherein the restriction section includes a guide section configured to guide the first cover so that it opens by contacting the first cover and after the first cover is opened by the guide section, the engagement of the engagement section with the main housing is released.

5. The housing structure, according to claim 2, wherein the sliding member further includes a second engagement section configured to engage the main housing and the first engagement section and the second engagement section are positioned in a longitudinal direction of the sliding member.

6. The housing structure, according to claim 2, wherein the first cover is engageable with the second cover.

7. The housing structure, according to claim 2, wherein the sliding member is configured to slide in parallel with the first axis and the second axis.

8. The housing structure, according to claim 2, wherein the first axis and the second axis are coaxial.

9. The housing structure, according to claim 8, further comprising: a torsion spring provided around the second axis, wherein the torsion spring is set so that when a phase difference between the first cover and the second cover is a first value, load on the second axis increases, and so that when the phase difference is a second value, the load on the second axis decreases, and the first value is smaller than the second value.

10. The housing structure, according to claim 2, wherein a maximum opening angle of the first cover and the second cover with respect to the main housing is larger than a maximum angle between the first cover and the second cover.

11. The housing structure, according to claim 2, wherein when the second cover is opened in a state where the first cover is opened, the first cover and the second cover are stopped by friction between the first cover and the second cover, in a state where the first cover is separated from the second cover.

12. A recording device comprising:

the housing structure, according to claim 2 and a recording section that is accommodated in the main housing and that performs recording on a medium.

13. The recording device, according to claim 12, further comprising:

a detachable and attachable section configured to enable a developer unit containing a developer to be attached and detached, wherein the second cover is a cover that covers the detachable and attachable section and the first cover is a placement section on which the medium to be recorded by the recording section is placed.

* * * * *